US008152641B2

(12) United States Patent
Hill

(10) Patent No.: US 8,152,641 B2
(45) Date of Patent: Apr. 10, 2012

(54) ON LINE GAMING WITH REAL-WORLD DATA

(76) Inventor: Otho Dale Hill, Spring Branch, TX (US)

( * ) Notice: Subject to any disclaimer, the term of this patent is extended or adjusted under 35 U.S.C. 154(b) by 0 days.

(21) Appl. No.: 13/015,800

(22) Filed: Jan. 28, 2011

(65) Prior Publication Data

US 2011/0300917 A1 Dec. 8, 2011

Related U.S. Application Data

(63) Continuation of application No. 12/945,693, filed on Nov. 12, 2010, which is a continuation-in-part of application No. 12/829,156, filed on Jul. 1, 2010.

(51) Int. Cl.
*A63F 13/12* (2006.01)

(52) U.S. Cl. ................................ 463/40; 463/11; 463/42

(58) Field of Classification Search ................ 463/9, 16, 463/40, 42, 11–13, 17–19
See application file for complete search history.

(56) References Cited

U.S. PATENT DOCUMENTS 5,374,061 A 12/1994 Albrecht (Continued)

FOREIGN PATENT DOCUMENTS

AU 199927863 B2 2/1999

(Continued)

OTHER PUBLICATIONS

Allison, W., The Opening of City of Dreams: An Interview with Surveillance Director, Leroy Daniel', The Catwalk, 2006, Downloaded on Dec. 1, 2010 from http://www.worldgameprotection.com/archive/2009-06/city-of-dreams.html, 5 pages.

(Continued)

*Primary Examiner* — Peter DungBa Vo
*Assistant Examiner* — Damon Pierce
(74) *Attorney, Agent, or Firm* — Kilpatrick Townsend & Stockton LLP; Philip H. Albert

(57) ABSTRACT

In one aspect, a method, systems, and apparatuses provide for online gaming that integrates sensory data and/or gameplay data from a real-world environment, and in particular, interactive online gaming within an environment incorporating playback of a recorded instance of an original, live card game played in a real-world environment, wherein the online game may be provided in a delayed manner or in real-time. In one aspect, sensory data and/or gameplay data from a live card game in a real-world environment are recorded for delayed playback or streamed live in real-time, and a remote player is able to access the game online and participate in the game as if the remote player had been present at the original, live card game in the real-world environment. In one aspect, the remote player may play in the online game at the position/seat occupied by one or more of the original, real-world players in the original, real-world game. In one aspect, in games where a player is dealt his or her own hand of cards, the remote player will receive cards as they were dealt to the original, real-world player that occupied the same position/seat in the original, real-world game. In one aspect, the remote player may able to make strategic decisions during gameplay that differ from those of the original, real-world player, wherein such strategic decisions may affect the outcome of the game for that player. In one aspect, the real-world environment is a gaming area at a casino.

20 Claims, 12 Drawing Sheets

U.S. PATENT DOCUMENTS

| | | | |
|---|---|---|---|
| 5,605,334 | A | 2/1997 | McCrea, Jr. |
| 5,722,893 | A | 3/1998 | Hill et al. |
| 5,779,546 | A | 7/1998 | Meissner et al. |
| 5,800,268 | A | 9/1998 | Molnick |
| 5,803,808 | A | 9/1998 | Strisower |
| 5,851,011 | A | 12/1998 | Lott |
| 5,941,769 | A | 8/1999 | Order |
| 6,039,650 | A | 3/2000 | Hill |
| 6,093,103 | A | 7/2000 | McCrea, Jr. |
| 6,165,069 | A | 12/2000 | Sines et al. |
| 6,217,447 | B1 | 4/2001 | Lofink et al. |
| 6,299,536 | B1 | 10/2001 | Hill |
| 6,508,709 | B1 | 1/2003 | Karmarkar |
| 6,582,301 | B2 | 6/2003 | Hill |
| 6,638,161 | B2 | 10/2003 | Soltys |
| 7,699,694 | B2 | 4/2010 | Hill |
| 2002/0068635 | A1 | 6/2002 | Hill |
| 2002/0147042 | A1 * | 10/2002 | Vuong et al. .................... 463/40 |
| 2003/0109306 | A1 | 6/2003 | Karmarkar |
| 2003/0195025 | A1 | 10/2003 | Hill |
| 2003/0232651 | A1 | 12/2003 | Huard et al. |
| 2004/0053675 | A1 | 3/2004 | Nguyen et al. |
| 2004/0135316 | A1 | 7/2004 | Lipscomb |
| 2005/0176500 | A1 | 8/2005 | Mathews et al. |
| 2005/0181870 | A1 | 8/2005 | Nguyen |
| 2006/0052149 | A1 | 3/2006 | Bursill |
| 2006/0154715 | A1 | 7/2006 | Black et al. |
| 2006/0205508 | A1 | 9/2006 | Green |
| 2006/0217199 | A1 | 9/2006 | Adcox et al. |
| 2006/0234795 | A1 | 10/2006 | Dhunjishaw et al. |
| 2006/0287105 | A1 | 12/2006 | Willis |
| 2007/0117637 | A1 | 5/2007 | Morgan et al. |
| 2007/0178955 | A1 | 8/2007 | Mills |
| 2007/0265049 | A1 | 11/2007 | Black |
| 2008/0026807 | A1 | 1/2008 | Moshal et al. |
| 2008/0032798 | A1 | 2/2008 | Hatamian et al. |
| 2008/0146342 | A1 | 6/2008 | Harvey et al. |
| 2009/0023489 | A1 | 1/2009 | Toneguzzo |
| 2009/0062008 | A1 | 3/2009 | Karmarkar |
| 2009/0239650 | A1 | 9/2009 | Alderucci et al. |
| 2009/0325716 | A1 | 12/2009 | Harari |
| 2010/0124967 | A1 | 5/2010 | Lutnick et al. |
| 2010/0203953 | A1 | 8/2010 | Alderucci et al. |
| 2010/0271367 | A1 | 10/2010 | Vaden et al. |

FOREIGN PATENT DOCUMENTS

| | | | |
|---|---|---|---|
| AU | 2001277883 | B2 | 7/2001 |
| CA | 2320707 | A1 | 9/1999 |
| CA | 2280194 | A1 | 2/2001 |
| CA | 2414548 | A1 | 1/2002 |
| EP | 1335783 | B1 | 10/2007 |
| JP | 2008-245871 | A | 10/2008 |
| WO | WO 02/05914 | A1 | 1/2002 |
| WO | 2008/134377 | A1 | 11/2008 |
| WO | 2008/152412 | A1 | 12/2008 |
| WO | WO 2009/126780 | A2 | 10/2009 |

OTHER PUBLICATIONS

Dallmeier, High-definition in security applications and product summaries, from website www.dallmeier.com, downloaded on Mar. 1, 2011 from http://www.dallmeier-electronic.com/en/cctv-ip-video-surveillance/catalogue-download.html; pp. 8, 10, 70, 136, 140, 141, 142, 144, 145, 180, and 181.

Non-Final Office Action for U.S. Appl. No. 12/829,156 mailed Feb. 14, 2011; 13 pages.

Supplementary European Search Report for Application No. EP 01955828 dated Feb. 17, 2005, 2 pages.

International Search Report of Nov. 6, 2001 for PCT Patent Application No. PCT/US01/22136 mailed on Nov. 6, 2001; 2 pages.

Supplemental Non-Final Office Action for U.S. Appl. No. 12/829,156, mailed on May 18, 2011, 12 pages.

Non-Final Office Action for U.S. Appl. No. 12/945,693, mailed on Jul. 11, 2011, 9 pages.

International Search Report and Written Opinion corresponding to the PCT Application No. PCT/US2011/025541, mailed on Apr. 25, 2011, 23 pages.

* cited by examiner

Remote Players Decision Display 800

Real-World Players Decision Keyboard 800

ON LINE GAMING WITH REAL-WORLD DATA

CROSS-REFERENCES TO RELATED APPLICATIONS

The present application is a continuation of U.S. application Ser. No. 12/945,693, filed on Nov. 12, 2010, entitled "Online Gaming With Real-World Game Data," which is a continuation-in-part of U.S. application Ser. No. 12/829,156, filed on Jul. 1, 2010, entitled "Online Gaming With Real-World Game Data," the contents of which are incorporated herein by reference in their entirety.

BACKGROUND

The casino environment is specially designed to entice and captivate a potential player (i.e., customer) through all five senses and beyond. The player is surrounded by luxurious decor, tables, and chips, and elegantly-clad dealers and/or croupiers. Distractions also surround the player, including smiling waitresses in revealing outfits, free alcoholic drinks, music from live bands, and a near-constant clanging, chiming, and ringing from nearby slot machines. And not the least of these sensory elements of the casino experience are the sights and sounds of other players in the casino, both fellow players at the table and those at nearby tables, whether cheers of excitement, gasps of dismay, or commentary and banter. All of these contribute to the real-world casino environment and the experience of casino gambling; however, players must travel to a casino, which may be costly in terms of time or money, or simply difficult, e.g., as it may be for people who are elderly, physically handicapped, or averse to smoke-filled environments.

Even so, many players prefer gaming in a live, real-world environment, not only because of the sensory elements described above, but also because online games are suspected of being "rigged" to increase the house advantage, and because the authenticity of online games may be more difficult for a player or disinterested observer to verify. When a player enters a real-world casino, not only is the player able to verify (whether by counting cards or otherwise) the authenticity of the game, but the player is also able to rely upon the reputation of the casino for not providing "crooked" games. Many players will even move from table to table, often having played only a single hand at a given table, looking for a "good" dealer or a "hot" game—such an assessment often depends on many elements that are best assessed in person.

Online gaming has attempted to bring the casino experience into the home, and many different websites and downloadable applications are available to play many varieties of games, including but not limited to blackjack, poker, baccarat, roulette, craps, dice, etc. Gaming at such websites may involve one or more software programs enabling the remote game player to enter any wagers and gameplay actions required to play the game (e.g., ante, small blind, big blind, bring-in, post, straddle, sleeper, call, raise, check-raise, all-in, double-down, split, double-after-split, pay commission, side bets/surrender/insurance, bet on another player, bet on banker, stand/stay/stick, hit/draw, fold, show/turn a card, select individual card(s) to hold or discard, select ordering of cards in one's hand). In online gaming, the cards that are dealt may be controlled by a random-number-generator ("RNG"). Other aspects of the gaming website may include accounting/financial software (e.g., electronic funds transfer ("EFT"), wire transfer, credit card authorization), statistical analysis software, and game-monitoring/security software applications. However, the majority of online casino gaming websites only provide computer-generated graphics and canned sound effects; some websites have attempted to recreate a more realistic environment by providing features such as a "live dealer," but even these websites do not capture most of the real-world casino environment.

In addition, online gaming presents risks for remote players. The ownership and gaming jurisdictions from which the host online casino is operating is not always easily transparent to the remote player. It also is very difficult, to determine the integrity of the games offered for play, and/or the integrity of a particular virtual shoe used by online casinos offering games of chance. Typically, online casinos do not disclose the house game advantage, their deck-penetration rule, and their policy for resolving disputes. Even were such information to be provided, it would be almost impossible to verify the accuracy of the information, and dispute resolution is typically a lengthy and frustrating, if not futile, process. Furthermore, online casinos do not guarantee that the remote players will be paid when he/she chooses to cash out. In many instances, when a remote player chooses to close an account with a positive balance, the player is not always paid the remaining balance, much less promptly.

Online gaming also has its risks for the game provider—many online casinos risk violating the law by accepting wagers from remote players located in countries or states where one or more forms of online gambling are illegal. Online casinos face difficulty in verifying the age and location of the remote player, both of which may be essential to verify that the player has a legitimate right to play games on the website. Currently, the majority of real-world casinos will issue a Player Tracking Card ("PTC") to customers who produce a valid, government-issued photo ID verifying that the customer is legally of age to gamble in the gaming jurisdiction of the issuing real-world casino; however, most online gambling sites do not have the ability to accept and verify a PTC, especially those issued by an un-related entity. There is a need for new and improved security methods applicable to legally licensed online casinos that will benefit all remote players and parties engaged in the operation and regulation of online casinos accepting wagers on games of chance, including but not limited to protecting the assets of the remote players, the online casinos, casino regulators, any associated financial institutions or other businesses, and the general public.

SUMMARY OF THE INVENTION

In one aspect, a method, systems, and apparatuses provide for online gaming that integrates sensory data and/or gameplay data from a real-world environment, and in particular, interactive online gaming within an environment incorporating playback of a recorded instance of an original, live game played in a real-world environment, wherein the online game may be provided in a delayed manner or in real-time. In one aspect, sensory data and/or gameplay data from a live game in a real-world environment are recorded for delayed playback or streamed live in real-time, and a remote player is able to access the game online and participate in the game as if the remote player had been present at the original, live game in the real-world environment. In one aspect, the remote player may play in the online game at the position/seat occupied by one or more of the original, real-world players in the original, real-world game. In one aspect, in games where a player is dealt his or her own hand of cards, the remote player will receive cards as they were dealt to the original, real-world player that occupied the same position/seat in the original, real-world game. In one aspect, the remote player may able to make strategic decisions during gameplay that differ from those of the original, real-world player, wherein such strategic decisions may affect the outcome of the game for that player. In one aspect, the real-world environment is a gaming area at a casino.

A system is provided for online gaming with real-world data, comprising: one or more capture devices for capturing gameplay data from a live game in a real-world environment; a first non-transitory computer-readable medium for storing a first database containing captured gameplay data that is available for delayed playback; a memory comprising instructions for an engine for processing the captured gameplay data; and an online game server, wherein the online game server presents a user interface on a remote player's client computer, wherein the user interface includes the captured gameplay data.

The system may also comprise: one or more capture devices for capturing sensory data from a live game in a real-world environment; a second non-transitory computer-readable medium for storing a second database containing captured sensory data that is available for delayed playback; a memory comprising instructions for an engine for processing the captured sensory data; and the online game server, wherein the user interface presented by the online game server includes the captured sensory data.

The online game server may receive information about a gameplay action and process the gameplay action. Processing the gameplay action may comprise, among other steps, determining that the gameplay action triggered a divergence situation and resolving the divergence situation. The online game server may also receive information about a wager and process the wager.

The online game server may receive information about a Player Tracking Card associated with the remote player and verify the remote player's age. The online game server may also determine a location for the remote player's client computer.

An online game server is provided for online gaming with real-world data, wherein the online game server is operable to execute instructions comprising: using a network connection to receive captured gameplay data that is available for delayed playback, wherein the captured gameplay data was captured from a live game in a real-world environment; using a processor and a memory to process the captured gameplay data; using the network connection to transmit information to present a user interface on a remote player's client computer, wherein the user interface includes the captured gameplay data; using the network connection to receive information about a gameplay action; using the processor and the memory to process the gameplay action; using the network connection to receive information about a wager; using the processor and the memory to process the wager; and using the network connection to transmit information to present a game outcome to the remote player.

The online game server may be operable to execute further instructions comprising: using the network connection to receive captured sensory data that is available for delayed playback, wherein the captured sensory data was captured from a live game in a real-world environment; using the processor and the memory to process captured sensory data; and using the network connection to transmit information to present the user interface, wherein the user interface includes the captured sensory data. The online game server may also be operable to execute further instructions comprising determining that the gameplay action triggered a divergence situation and resolve the divergence situation.

A computer-implemented method is provided for online gaming with real-world data, comprising: using one or more capture devices to capture gameplay data from a live game in a real-world environment; using a processor to store a first database containing captured gameplay data that is available for delayed playback, wherein the first database is stored in a first non-transitory computer-readable medium; using the processor and a memory to process the captured gameplay data; and transmitting information over a network connection to present a user interface on a remote player's client computer, wherein the user interface includes the captured gameplay data.

The method may also comprise: using one or more capture devices to capture sensory data from the live game in the real-world environment; using the processor to store a second database containing captured sensory data that is available for delayed playback, wherein the second database is stored in a second non-transitory computer-readable medium; using the processor and the memory to process the captured sensory data; and transmitting information over the network connection to present the user interface, wherein the user interface includes the captured sensory data.

The method may also comprise: receiving information over the network connection about a gameplay action; and using the processor and the memory to process the gameplay action. Processing the gameplay action may comprise determining that the gameplay action triggered a divergence situation and resolving the divergence situation. The method may also comprise receiving information over the network connection about a wager and processing the wager.

The method may also comprise receiving information over the network connection about a Player Tracking Card associated with the remote player and verifying the remote player's age. The method may also comprise determining a location for the remote player's client computer.

A computer-implemented method is provided for online gaming with real-world data, comprising: using a network connection to receive captured gameplay data that is available for delayed playback, wherein the captured gameplay data was captured from a live game in a real-world environment; using a processor to process the captured gameplay data; using the network connection to transmit information to present a user interface on a remote player's client computer, wherein the user interface includes the captured gameplay data; using the network connection to receive information about a gameplay action; using the processor to process the gameplay action; using the network connection to receive information about a wager; using the processor to process the wager; and using the network connection to transmit information to present a game outcome to the remote player.

The computer-implemented method may also comprise: using the network connection to receive captured sensory data that is available for delayed playback, wherein the captured sensory data was captured from a live game in a real-world environment; using the processor to process captured sensory data; and using the network connection to transmit information to present the user interface, wherein the user interface includes the captured sensory data. The computer-implemented method may also comprise determining that the gameplay action triggered a divergence situation and resolving the divergence situation

BRIEF DESCRIPTION OF THE DRAWINGS

FIG. 7(*b*) is an illustration of a web page including an overhead view of an intelligent Big Baccarat game table with a compact Remote Player's User Interface.

FIG. 7(*c*) is an illustration of a web page including an overhead view of an intelligent mini-Baccarat game table with an incorporated Remote Player's User Interface.

FIG. 7(*d*) is an illustration of a web page including an overhead view of an intelligent Blackjack game table with an incorporated Remote Player's User Interface.

FIG. 7(*e*) is an illustration of a web page including an overhead view of an intelligent poker game table with an incorporated Remote Player's User Interface.

DETAILED DESCRIPTION OF THE INVENTION

In one aspect, a method, systems, and apparatuses advantageously provide for online gaming that integrates sensory data and/or gameplay data from a real-world environment, and in particular, interactive online gaming within an environment incorporating playback of a recorded instance of an original, live game in a real-world environment, wherein the online game may be provided in a delayed manner or in real-time. Sensory data and/or gameplay data from an original, live game in a real-world environment may be recorded for delayed playback or streamed live in real-time, and a remote player is able to access the game online and participate in the game as if the remote player had been present at the original, live game in the real-world environment. Delayed playback may occur at any time after the end of the original, live game, game hand, game round, etc. The remote player may play in the online game at the position/seat occupied by one or more of the original, real-world players in the original, real-world game. In games where an individual hand of cards is dealt to a player or seat/position the remote player will receive cards as they were dealt to the original, real-world player or seat/position that occupied the same position/seat in the original, real-world game. The remote player may able to make strategic decisions during gameplay that differ from those of the original real-world player, wherein such strategic decisions may affect the outcome of the game for that remote player. The remote player may also be able to select the option of taking the same strategic decisions as those of the original real-world player, in which case the outcome of the game for the remote player will also be the same as that of the original real-world player. One example of such a real-world environment is a gaming area at a casino.

Overview

Figure 1:
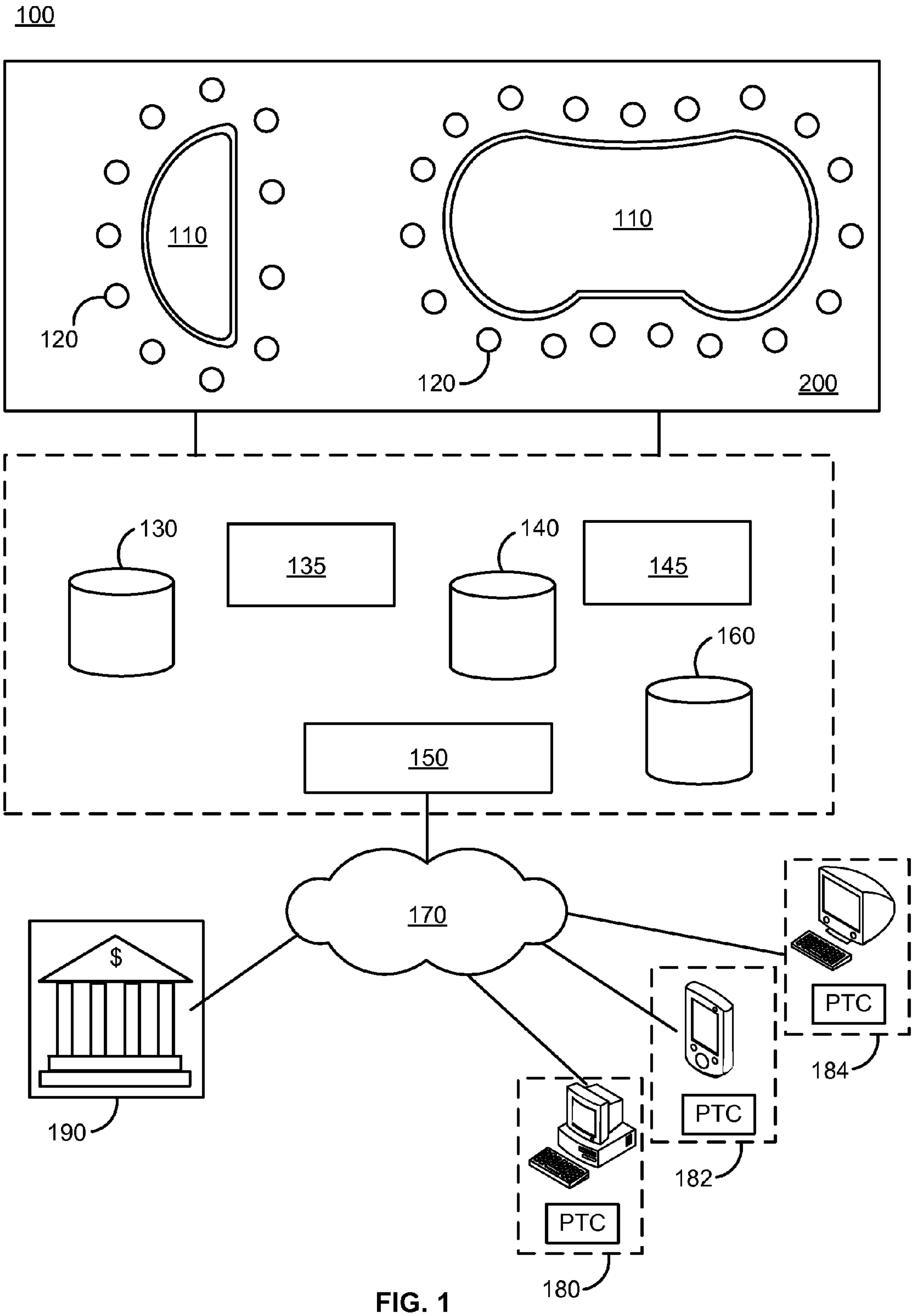
FIG. 1 is a schematic of a system providing interactive online gaming within an environment incorporating sensory data and/or gameplay data from a live, real-world game.

FIG. 1 illustrates a system providing interactive online gaming within an environment incorporating sensory data and/or gameplay data from a real-world, live game. System 100 captures sensory data and/or gameplay data from live games being played at real-world casino gaming area 200. Gaming area 200 may include one or more gaming tables 110 (e.g., Blackjack, mini-Baccarat, poker, Big Baccarat, craps) and capture devices 120 (e.g., video cameras, microphones, motion sensors, infrared sensors, RFID devices, card-dispensing shoes with scanners, intelligent game tables, etc.). Captured sensory data is sent to database 130 and/or engine 135, which processes (e.g., digitization, filtering, analysis, etc.) the captured sensory data. Engine 135 may also perform operations to prepare the captured sensory data to be streamed over the Internet (e.g., compression, any required blurring). Captured gameplay data is sent to database 140 and engine 145, which processes the gameplay data (e.g., to calculate statistics and determines other information as needed). After processing the gameplay data using engine 145, any resulting additional gameplay data that is generated may also be stored in database 140. Database 140 may also store casino-specific (e.g., target profit margins, permissible player winnings, player blacklists), location-specific (e.g., localization data, jurisdiction-specific laws and regulations), and general game-specific (e.g., first-card advantage statistics, permissible deck penetration, rules for dealing cards) information. Some or all of the aforementioned components of system 100 may be accessible by online game server 150, which may be a networked server that provides online gaming functions within a user interface incorporating sensory data and/or gameplay data from a real-world, live game. PTC database 160 houses data related to PTCs issued by the casino. Online game server 150 provides gaming functionality through network 170 (e.g., the Internet, LAN, WAN, cell network, etc.) to remote players using client computers (represented by modules 180, 182, and 184) accessing an online gaming website via any conventional client computer. Online game server 150 may require a remote player 180, 182, or 184 to log in using a PTC; online game server 150 may then access PTC database 160 to authenticate the remote player. Online game server 150 also connects to financial institution or server 190 through network 170 to conduct financial transactions, including but not limited to payment of winnings and collection of bets and any fees (e.g., subscription fee) or taxes.

Some aspects in the system shown in FIG. 1 include conventional, well-known aspects that need not be explained in detail here. For example, the client computer used by remote players 180, 182, and 184 could include a desktop personal computer, workstation, laptop, personal digital assistant ("PDA"), cell phone, or any WAP-enabled device or any other computing device capable of interfacing directly or indirectly, synchronously or asynchronously to the Internet or other network connection. The client computer typically runs a HTTP client, e.g., a browsing program, such as Microsoft's Internet Explorer® browser, Mozilla's Firefox® browser, Netscape's Navigator® browser, Apple's Safari® browser, the Opera© browser, or a WAP-enabled browser in the case of a cell phone, PDA, or other wireless device, or the like, thereby allowing a user (i.e., remote player) of the client computer to access, process and view information and pages available to it from online game server 150 over network 170. Each client computer also typically includes one or more user interface devices, such as a keyboard, a mouse, touch screen, pen or the like, microphone, speakers, for interacting with a user interface ("UI") provided by the browser on a display (e.g., monitor screen, LCD display, etc.) in conjunction with pages, forms and other information provided by online game server 150 or other systems or servers. As discussed above, the present invention is suitable for use with the Internet, which refers to a specific global internetwork of networks. However, it should be understood that other networks can be used instead of the Internet, such as an intranet, an extranet, a virtual private network ("VPN"), a cell network, a non-TCP/IP-based network, any LAN or WAN or the like.

According to one embodiment, each client computer and all of its components are operator-configurable using various applications, such as an Internet browser, including computer code run using a central processing unit such as an Intel Pentium® processor or the like. Similarly, online game server 150, engine 135, and engine 145 (and additional instances of online game server 150, engine 135, and engine 145, where more than one is present) and all of its components might be operator-configurable using application(s) including computer code run using a central processing unit such as an Intel Pentium® processor or the like, or multiple processor units. Computer code for operating and configuring online game server 150, engine 135, and engine 145 to intercommunicate and to process web pages and other data and media content as described herein is preferably downloaded and stored on a hard disk, but the entire computer code, or portions thereof, may also be stored in any other volatile or non-volatile memory medium or device as is well known, such as a ROM or RAM, or provided on any media capable of storing computer code, such as a compact disk ("CD") medium, digital versatile disk ("DVD") medium, a floppy disk, and the like. Additionally, the entire computer code, or portions thereof, may be transmitted and downloaded from a software source, e.g., over the Internet, or from another server, as is well known, or transmitted over any other conventional network connection as is well known (e.g., extranet, VPN, LAN, WAN, WiFi, token ring, cellular, etc.) using any communication medium and protocols (e.g., TCP/IP, HTTP, HTTPS, WAP, Ethernet, etc.) as are well known. It will also be appreciated that computer code for implementing aspects of the present invention can be implemented in any programming language that can be executed on a server or server system such as, for example, in C, C++, HTML, Java, JavaScript, WML, any other scripting language (e.g., VBScript), and many other programming languages as are well known.

It should also be understood that each client computer may include differing aspects, For example, one client computer might include a user's personal workstation running Microsoft's Internet Explorer® browser while connected to online game server 150 over a VPN, another client computer might include a thin-client netbook (e.g., Asus Eee PC®) running the Opera© browser while connected to online game server 150 through an extranet, another client computer might include an Apple iPad running the Safari® browser while connected to online game server 150 over a WiFi connection, and another client computer might include a PDA running a WAP-enabled browser while connected to online game server 150 over third-party cellular networks.

According to one embodiment, each online game server 150 is configured to provide web pages, forms, data and media content to client computers to support access by client computers. If more than one instance of online game server 150 is used, they may be located on a single server system or on more than one server system in close proximity to one another (e.g., in a server farm located in a single building or campus), or they may be distributed across server systems that are remote from one another (e.g., one or more server systems located in city A and one or more server systems located in city B). As used herein, each online game server 150 could be run on one or more logically and/or physically connected server systems distributed locally or across one or more geographic locations. Similarly, each of the data-processing engines described herein (i.e., engine 135, engine 145) may reside on one or more logically- and/or physically-connected server systems distributed locally or across one or more geographic locations. It is not required that the components of system 10 described herein all be located in a single facility or even that they all be controlled by a single entity—cloud-based implementations and other distributed applications are anticipated by this disclosure. Additionally, the term "server system" is meant to include a computer system, including processing hardware and process space(s), and an associated storage system and database application (e.g., relational database management system ("RDBMS")), as is well known in the art. It should also be understood that "server" is used herein to refer to software or firmware, and that "server system" is used herein to refer to hardware; however, as is well known in the art, the term server may, alternately and/or interchangeably, refer to either server software/firmware, or server hardware. Similarly, the databases described herein can be implemented as single databases, a distributed database, a collection of distributed databases, a database with redundant online or offline backups or other redundancies, etc., and might include a distributed database or storage network and associated processing intelligence.

Capturing Sensory Data

The sights, sounds, and other sensory elements of the general environment of the real-world casino may be captured using any conventional sensory capture devices. In one aspect, sensory data from the real-world casino environment may be captured using video cameras, microphones, infrared sensors, motion sensors, RFID devices, or any other conventional devices or technology capable of capturing sensory input and converting it into digital data. Such technology may be placed in any appropriate location, for example, positioned above the gaming area or gaming table, embedded within the surface of the gaming table, or built into furniture or decor. Such technology may also be connected to recording devices (e.g., a digital video recording device ("DVR")) that are able to continuously store data as it is captured.

Figure 2:
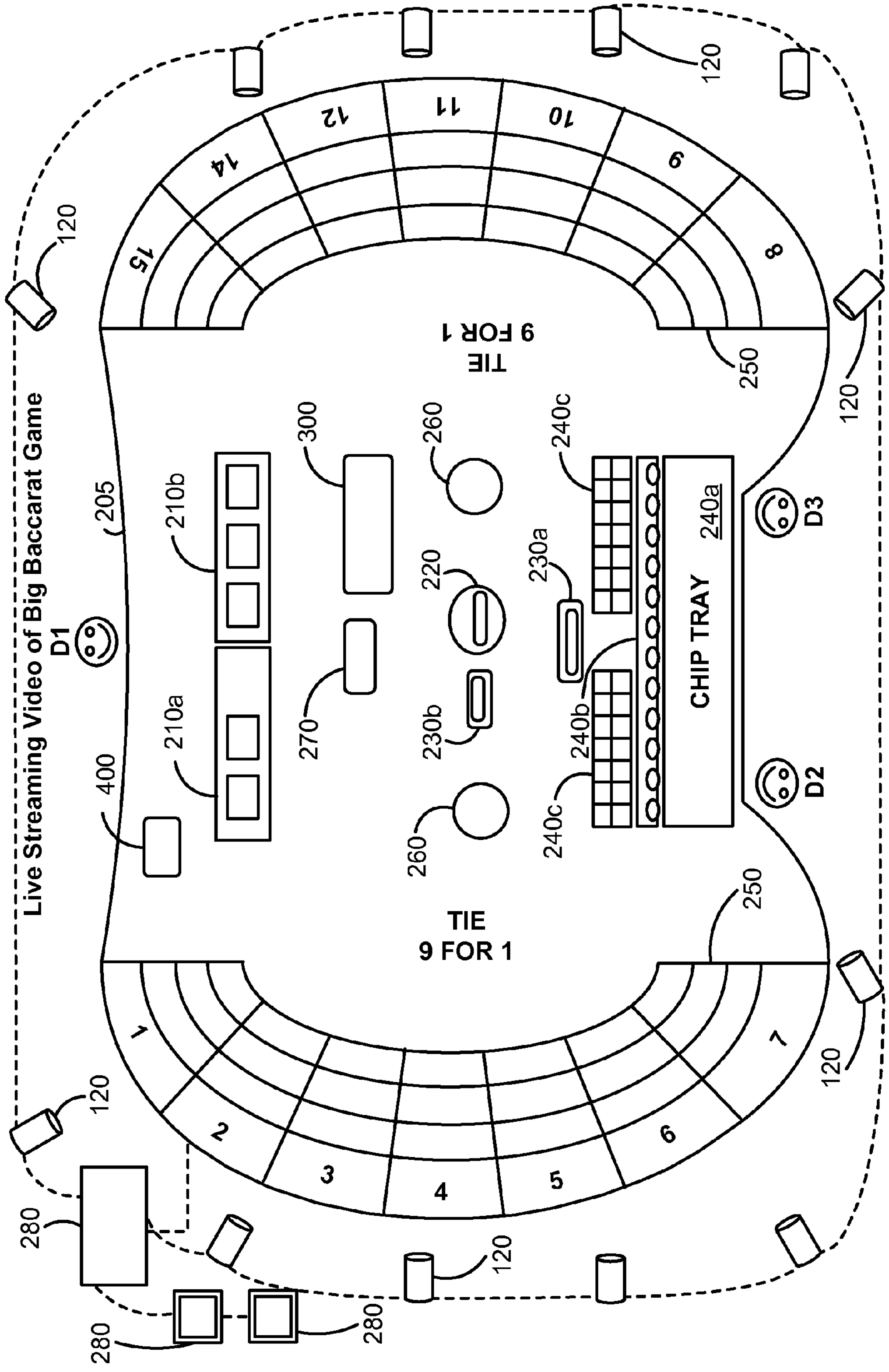
FIG. 2 is a top plan view of a Big Baccarat gaming area with capture devices.

FIG. 2 is a representative illustration of gaming area 200, which includes an intelligent gaming table 205 set up with capture devices that transmit captured data to back-end systems for processing, storage, and/or re-transmission. In the depicted example, gaming area 200 includes an intelligent gaming table 205 designed for Big Baccarat; however, gaming area 200 can include any type of game whose sensory data and/or gameplay data can be captured by capture devices, whether or not an intelligent gaming table is utilized. In one aspect, intelligent gaming table 205 includes conventional features of a Big Baccarat gaming table, such as a designated area to display the Player's Hand 210*a*, a designated area to display the Banker's Hand 210*b*, a card discard slot or area 220, a cash drop slot 230*a*, a tip box 230*b*, chip tray 240*a*, commission chip rack 240*b*, commission boxes 240*c* for each seat, individual betting areas 250 (which may have specific areas to place different bets, e.g., for Baccarat, placing bets on any of the Player's Hand, the Banker's Hand, and a Tie). Croupiers/dealers are positioned at locations D1, D2, and D3. In one aspect, intelligent gaming table 205 may also include built-in or embedded capture devices 260 (e.g., microphones under the felt, RFID receivers to identify chips and cards), or other devices 270 to aid players, both live and remote, to be aware of aspects of gameplay (e.g., a multi-color light or other visual display to indicate the results of each round of gameplay). In one aspect, gaming area 200 may also include one or more capture devices 120 positioned around, above, or below intelligent gaming table 205 (e.g., video cameras, microphones). In one aspect, a conventional shuffling machine, as is well known in the art, may also be positioned on or near intelligent gaming table 205. In one aspect, a control device 400 may be used to control capture devices in gaming area 200. In one aspect, one of the capture devices may be an intelligent card-dispensing shoe 300. Data from the capture devices in gaming area 200 is sent to back-end systems 280 for processing, storage, and/or re-transmission. Back-end systems 280 may also be able to control capture devices 120 and 260 (e.g., panning, tilting, and/or zooming video cameras, controlling microphone activation and volume). Transmission of data from gaming area 200 to back-end systems 280 is preferably implemented using secure technologies (e.g., CCTV, encryption).

In one aspect, sensory data and/or gameplay data from the real-world casino environment may be securely transmitted from the capture devices to one or more networked servers for storage via any conventional technology, including but not limited to closed-circuit television ("CCTV") and wired or wireless TCP/IP. In one aspect, any such transmission is secured using conventional strategies, including but not limited to encryption, authentication and authorization, and any other security measures that may apply to the data, the point of data capture, the transmission medium, the point of data reception, and/or the one or more networked servers. A networked server includes at least a processor, memory (e.g., RAM), a storage medium (e.g., a hard disk, optical drive, or static storage), and a network connection (e.g., TCP/IP). A casino may use existing surveillance systems to capture, transmit, and store the data. The Hill family of card-dispensing shoe patents (U.S. Pat. Nos. 5,722,893, 6,039,650, 6,299,536, 6,582,301, and 7,699,694) discloses features and aspects of a system designed to capture gameplay data.

Capturing Gameplay Data

Some important gameplay data of the real-world environment to capture, for at least card games, may include: the pre-existing sequence of cards that comprise a particular shoe (which may include the number, sequence, identity, and order of the cards); the identity and order of the cards that are dealt out; the number, sequence, identity, and order of the cards remaining in a particular shoe when it is removed from a card-dispensing shoe after having triggered the casino's deck penetration rule; the identity of the player, seat/position, game hand, or dealer receiving each card that is dealt out; the number of cards dealt to each player, seat/position, game hand, or dealer; and the identity of any cards discarded, as well as the identity of the player, seat/position, game hand, or dealer by whom or from which the cards were discarded. For other games, such as roulette or craps, although there is no player-specific information, there may still be important gameplay data to capture (e.g., for roulette, the motion of the ball and the wheel and the pocket in which the ball lands; for craps, the selection and toss of the dice, the faces of the dice that land facing up, and the call of the play of the game). This information may be needed, not only for gameplay, but also to ensure the integrity of the game. Finally, for any game that involves wagers by the players, bets may also be captured (including those of other real-world players) in order to enhance the feeling of immersion in the real-world casino environment; however, since the remote player will be setting their own wagers, this may not be essential to capture in all games. U.S. Pat. Nos. 6,582,301 and 7,699,694, and U.S. Pat. App. Pub. No. 2003/0195025 (Hill, O. D.) describe various aspects of a system that captures players' bets. Note, as is well known in the art, the terms wager and bet may be used alternately and/or interchangeably.

As previously described, database 140 may store casino-specific, location-specific, and general game-specific information; however, it may also store game-specific information as each game round is played. Gameplay data specific to each game played may include: the name, gaming jurisdiction, and geographic location of the host casino, type of game being played, the game table number, the identity of the dealer and the identities of the live players, the date and time a particular shoe was placed in the card-dispensing shoe, and a serial number for each particular shoe dealt at the game table on that date; the time the first card was removed from a particular shoe to initiate the commencement of the first game round dealt from a particular shoe; as each card is removed from the card-dispensing shoe to be "burned" or dealt to a player, seat/position, game hand, or dealer, any data captured by the scanner or intelligent game table (e.g., card value, card rank, card suit and delivery sequence of each card delivered to a player, seat/position, game hand, or dealer including the game hand totals and game hand results, wins and losses); the time the round ended, the number of game rounds dealt, the number of game hands dealt in each round, the time when the last cards for the last round was dealt from a particular shoe, and the total time elapsed from the start-time of the first round dealt from a particular shoe to the end-time of the last round dealt from a particular shoe before the remaining inventory of the particular shoe was removed from the card-dispensing shoe. (Note, for the purpose of disambiguation, throughout this application, when referring to the physical card-dispensing shoe the term "card-dispensing shoe" is used, and when referring to the transient set of cards that is placed in a card-dispensing shoe to be dealt after having been shuffled, the term "particular shoe" is used. A particular shoe may be comprised of any number of playing cards, typically one or more standard 52-card decks.)

Intelligent gaming tables (e.g., Big Baccarat gaming table 205) may be electronically enhanced to include any number of devices (e.g., card sensors, dice sensors, wheel and ball sensors, bet sensors, automatic bet recognition devices, microphones, CCTV cameras, RFID chips, transmitters and receivers, sound- and video-recording devices) to capture any gameplay data (e.g., the identity of cards that are dealt out and the identity of the player, seat/position, game hand, or dealer to whom particular cards are dealt, the identity of cards that are discarded and the identity of the player, seat/position, game hand, or dealer who discarded the cards, the timing and amount of wagers that are placed and the identity of the player, seat/position, or game hand by whom particular wagers are made) and/or the general casino environment (e.g., microphones, special-angle cameras, such as those capturing the images of cards as a player discreetly peeks at them). Such devices may be embedded in the surface or sidewalls of the intelligent gaming table. U.S. Pat. Nos. 6,582,301 and 7,699,694, and U.S. Pat. App. Pub. No. 2003/0195025 (Hill, D.) describe various aspects of such an intelligent gaming table.

In one aspect, the pre-existing sequence of cards that comprise a particular shoe may be determined either by scanning the cards that comprise a particular shoe after it has been shuffled and is ready to be dealt, or it may be pre-determined (e.g., by a RNG) and then the cards may be sorted to conform to the pre-determined sequence. The pre-existing sequence of cards that comprise a particular shoe may be used to verify the order of cards as they are dealt in the original, real-world game and generate the order of cards as they are dealt in the online game. When the pre-existing sequence of cards has been obtained through scanning, such scanning may have been performed in several different ways. In one aspect, such scanning is performed before the decks of cards arrive at the casino, (e.g., while the decks of cards are still at a manufacturing or printing or packaging or distribution facility); in this aspect, information regarding the pre-existing sequence of cards in a given deck may be included with the deck of cards by using any conventional technology (e.g., an RFID chip, bar code, or magnetic strip incorporated into the packaging or inserted with the packaged deck of cards). This information may be read using an appropriate reading device, either at the casino or at another appropriate location; in one aspect, the information is read by card-dispensing shoe 300 as each new deck is loaded into the particular shoe. In one aspect, such scanning may be performed in a secure area at the casino; in this aspect, information regarding the pre-existing sequence of cards in a given deck may be included with the deck of cards as previously described, may be transmitted over a network to be stored in database 140, or may be transmitted directly to the gaming table where the cards are to be loaded into a card-dispensing shoe (e.g., to an intelligent game table, or to card-dispensing shoe 300). If the information is stored in database 140, it may again be transmitted over a network to the gaming table where the cards are to be loaded into a card-dispensing shoe. In one aspect, such scanning may be performed at the gaming table itself, either by card-dispensing shoe 300 or by a shuffling machine that is capable of scanning an entire shoe of cards after having shuffled the cards. In one aspect, such scanning may be performed by card-dispensing shoe 300, which may be able to read the entire shoe of cards prior to dispensing any cards, or which may simply scan each card as it is dispensed.

Figure 3:
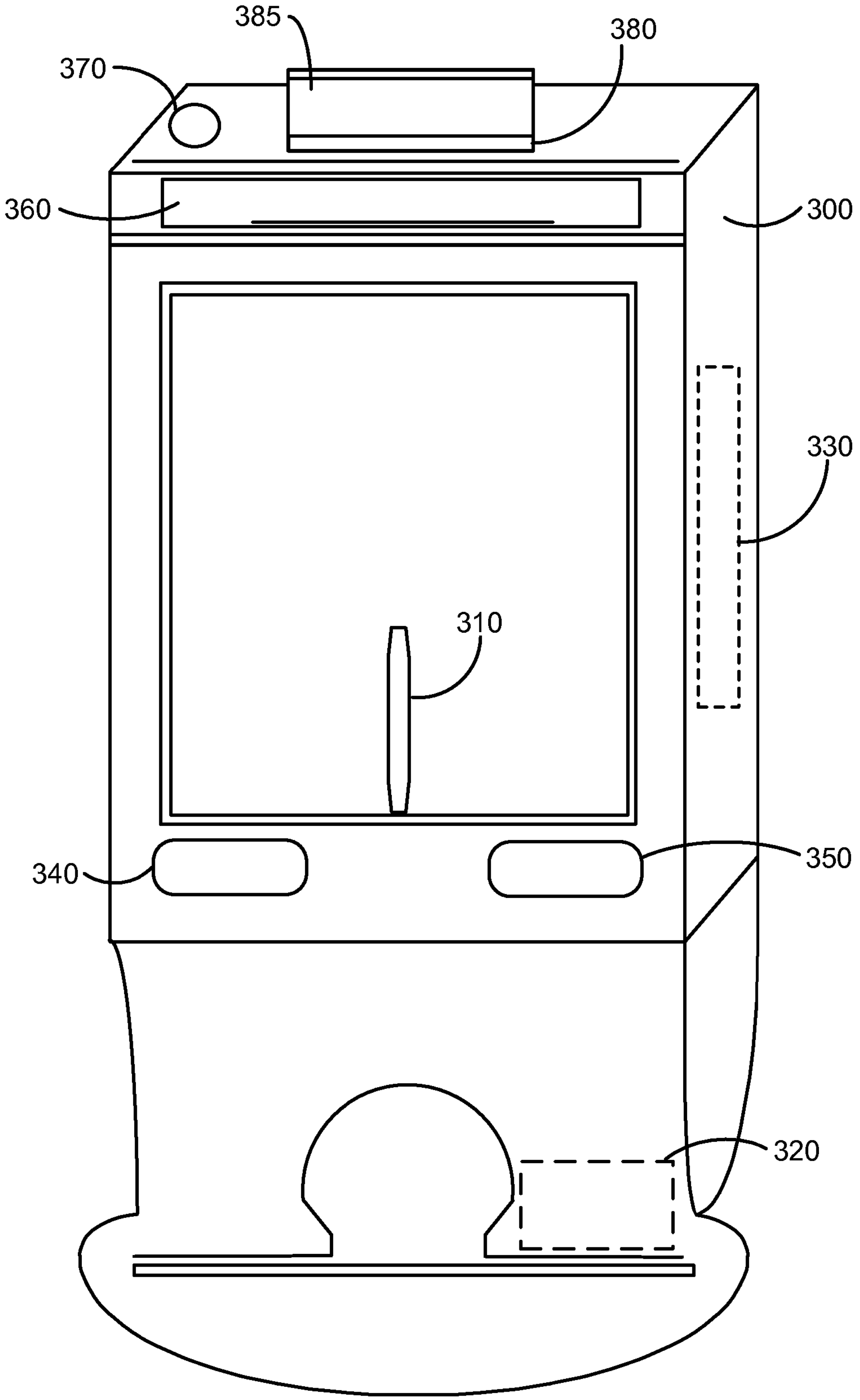
FIG. 3 is a top plan view of a card-dispensing shoe with a scanner.

FIG. 3 is a top plan view of a card-dispensing shoe 300. For card games, the identity and order of the cards that are dealt out and those that are discarded may be captured through card-dispensing shoe 300 and/or an intelligent gaming table. Card-dispensing shoe 300 may include a load switch 310 or similar mechanism to recognize that a freshly-shuffled particular shoe has been placed in card-dispensing shoe 300. Card-dispensing shoe 300 scans and identifies each card as it is dispensed; scanning may be accomplished by means of card scanner 320, which may be based on any conventional technology that can identify a particular card. In one aspect, card scanner 320 identifies the dispensed card merely by scanning the image on the face of the card as it is dispensed. In one aspect, each card is marked with an identifier in such a way as to be undetectable to a player or spectator (e.g., an invisible printed bar code or other mark, an embedded radio-frequency identification ("RFID") chip, a magnetic strip), wherein the card can be quickly and easily identified by a machine (e.g., a shuffling machine at a game table, an electronic card-dispensing shoe at a game table, an inspection machine at the casino, or a packaging machine at the factory). In one aspect, as each card is identified and dispensed, the identity of the dispensed card is stored in memory as part of the gameplay data; gameplay data may be temporarily stored in memory located in card-dispensing shoe 300 or in an intelligent game table, or it may be directly transmitted via network connection 330 to engine 145 or some other component of the back-end systems. In one aspect, as each card is identified and dispensed, the identity of the player, seat/position, game hand, or dealer to whom the card is dealt is also captured as part of the gameplay data; this may be accomplished using any conventional technology (e.g., an intelligent game table that is able to detect where a card was dealt, image recognition software on the back-end systems that is able to analyze the video images and detect where a card was dealt, or a keyboard or control panel upon which the croupier/dealer can indicate to whom a card was dealt).

Card-dispensing shoe 300 may also be able to shuffle cards; if this feature is available, there may be a Shuffle button 340 to trigger a shuffle of a particular shoe after the particular shoe has been exhausted according to the casino's deck-penetration rule and has been placed back into card-dispensing shoe 300. A shoe inventory of the freshly-shuffled particular shoe may be uploaded to card-dispensing shoe 300 for verification of the order in which each card is dispensed. If card-dispensing shoe 300 is able to shuffle cards, the cards in the particular shoe may be scanned after shuffling and before cards are dispensed. Either way, the inventory of a particular shoe is stored as part of the gameplay data; as with the identities of dispensed cards, the inventory of a particular shoe may be temporarily stored in memory located in card-dispensing shoe 300 or in an intelligent game table, or it may be directly transmitted to engine 145 or some other component of the back-end systems. Card-dispensing shoe 300 may include a Burn button 350 to dispense a card to be "burned;" in this case, as the card is dispensed, the fact that it was "burned" is captured as part of the gameplay data. Card-dispensing shoe 300 may also include other conventional features, such as LCD display 360, On/Off button 370, and a slot 380 to receive and read data from PTC 385.

The shoe may also include a processor and memory for storing gameplay data (e.g., inventory for a particular shoe, player strategies and proficiency, player first card advantage, permissible deck penetration, rules for dealing cards), or it may transmit such gameplay data to an intelligent game table or to a remote server for analysis. If the shoe is pre-loaded with the pre-existing sequence of cards in a particular shoe, it may verify each card as it is dispensed from the shoe to ensure that the order of the cards has not been tampered with (i.e., that the identity of each card and the order of the cards matches the pre-existing sequence of cards in the particular shoe). The Hill family of shoe patents (U.S. Pat. Nos. 5,722,893, 6,039,650, 6,299,536, 6,582,301, and 7,699,694, and U.S. Pat. App. Pub. No. 2003/0195025) discloses features and elements of a card-dispensing shoe with a scanner that discerns the value and suit of each card dispensed, and that analyzes and stores information related to card inventory, games, and players.

Figure 4:
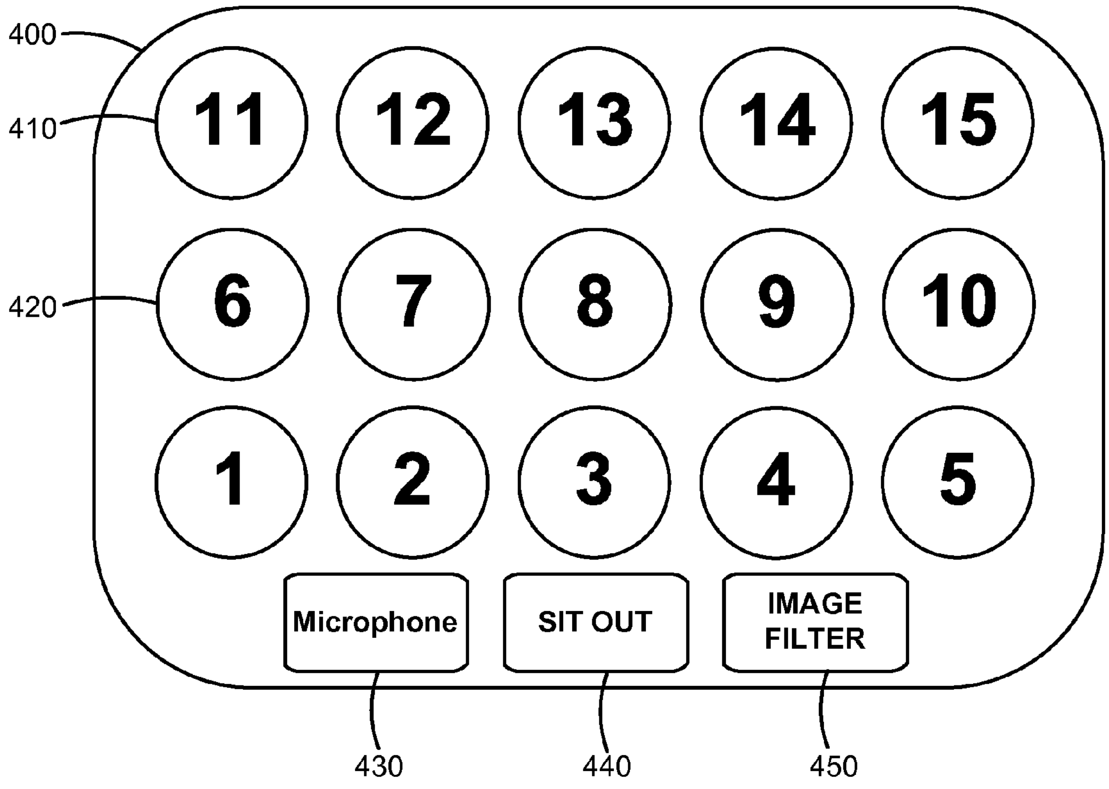
FIG. 4 is a schematic of a keypad for use by a dealer/croupier to control the recording of the game and designate the status of the seats/positions in a live, real-world game.

FIG. 4 is a schematic of control device 400 for use by a dealer/croupier to control the recording of the game by capture devices. Control device 400 may control any function that is conveniently and/or appropriately controlled by the croupier/dealer, for example: whether microphones, video cameras, and other capture devices focused on the gaming table are activated; whether a player has opted to "sit out" a particular round; the status of each seat/position (e.g., active or inactive); whether a player has requested that their image not be recorded or at least blurred out, etc. In one aspect, control device 400 includes a round individual player button for each potential player at the gaming table. In one aspect, each individual player button is dark (e.g., 410) or lit (e.g., 420) to indicate whether the associated seat at the gaming table is occupied; in one aspect, only one individual player button is depressed at any given time. In one aspect, control device 400 includes a Microphone button 430 that controls any microphones embedded into the gaming table, a Sit Out button 440 that can be used to indicate whether any particular player has opted to "sit out" a particular round, and an Image Filter button 450 that may be used in conjunction with the individual player button to indicate that a particular player has requested that their face not be shown during online gameplay. In one aspect, control device 400 is a touch-screen device, wherein all "buttons" are virtual buttons, represented by an image on a touch screen. In one aspect, control device 400 includes a status display area, wherein for each player, a status is displayed for each player (e.g., whether the player is sitting out, whether the player's face is to be blocked out). In one aspect, when a player has requested that their face be blocked out, their face will not appear on any online gaming websites; however, their face may still be visible to casino surveillance personnel viewing the video captured during the game.

Online Gaming Website

Figure 5:
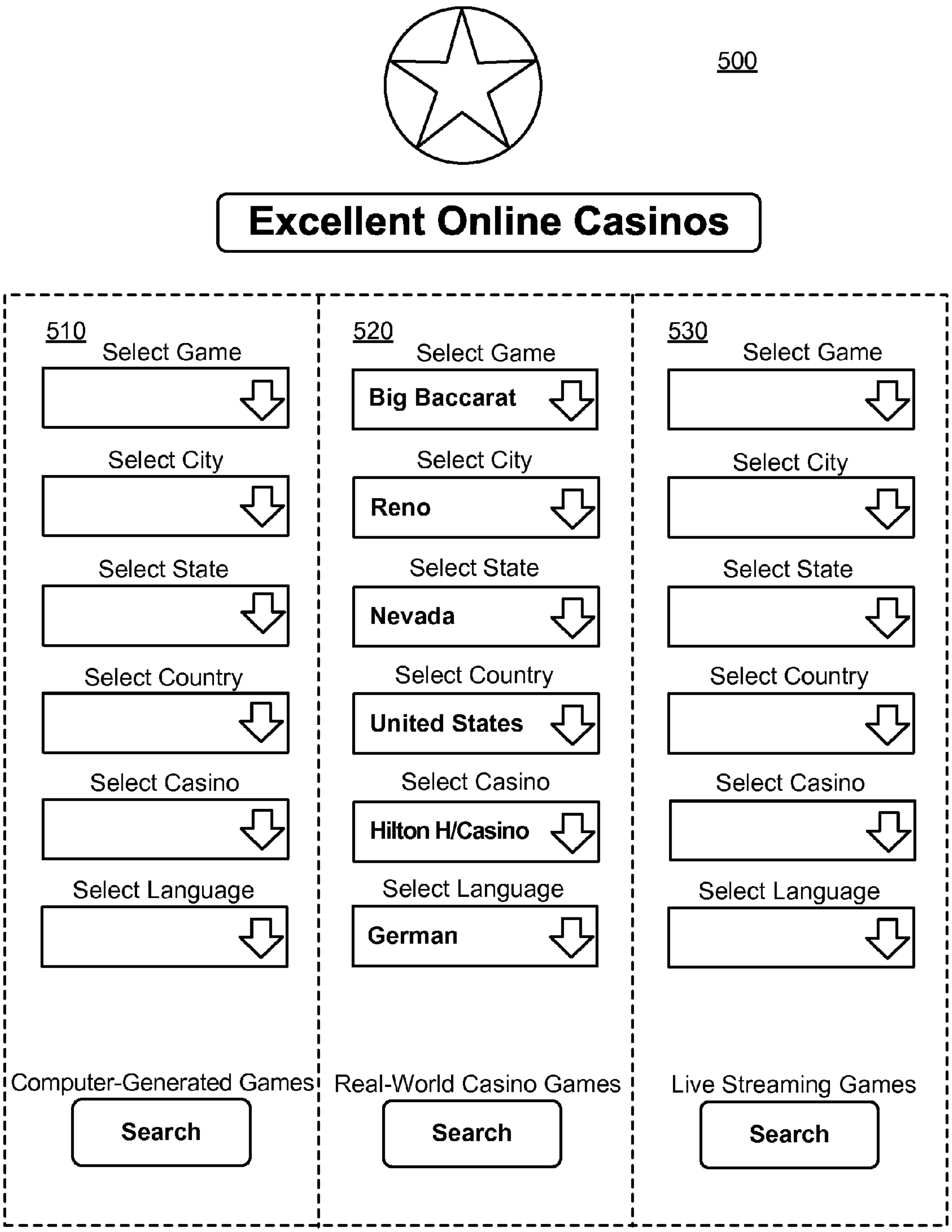
FIG. 5 is an illustration of a web page presenting a selection of online games.

FIG. 5 is an illustration of a web page 500 from an example online gaming website ("Excellent Online Casinos") presenting a search interface to find online games. Web page 500 may display a plurality of categories from which a remote player can select a game. In the example depicted in FIG. 5, the remote player can select between Computer-Generated Games 510, CCTV Recorded Games 520, and Live Games 530. Computer-Generated Games 510 may include any type of game wherein the background and games are computer-generated. Real-World Casino Games 520 may include pre-recorded games originally played by live players at a real-world casino; such pre-recorded games may include both sensory data and gameplay data, only gameplay data, or only sensory data. Live Streaming Games 530 may include games streaming live from a real-world casino or other venue in real-time. In one aspect, an online gaming website provides only one or two of the three categories of games. Web page 500 may also allow a remote player to search for a game by game type (e.g., Blackjack, Spanish 21, Big Baccarat, mini-Baccarat, Five-Card Stud Poker, Texas Hold 'Em Poker Tournament, Seven-Card Stud Poker, Pai Gow Poker, Caribbean Stud Poker, Let It Ride, Roulette, Craps, Pai Gow, Sic Bo, Bingo, Keno, etc.). Web page 500 may also allow a remote player to search for a game by the location of the original live, real-world game (e.g., city, state, country). Web page 500 may also allow a remote player to search for a game by selecting the casino at which the original live, real-world game was captured. An online gaming website may only provide games associated with a single casino, or it may provide games associated with multiple casinos. Web page 500 may also allow a remote player to select a language. Selection of a language may provide localization of displayed text and images. Selection of a language may also display captions/subtitles translating the captured audio from the live, real-world game. Alternately, selection of a language may allow the remote player to search for games wherein the original live, real-world game was conducted in the selected language.

Figure 6:
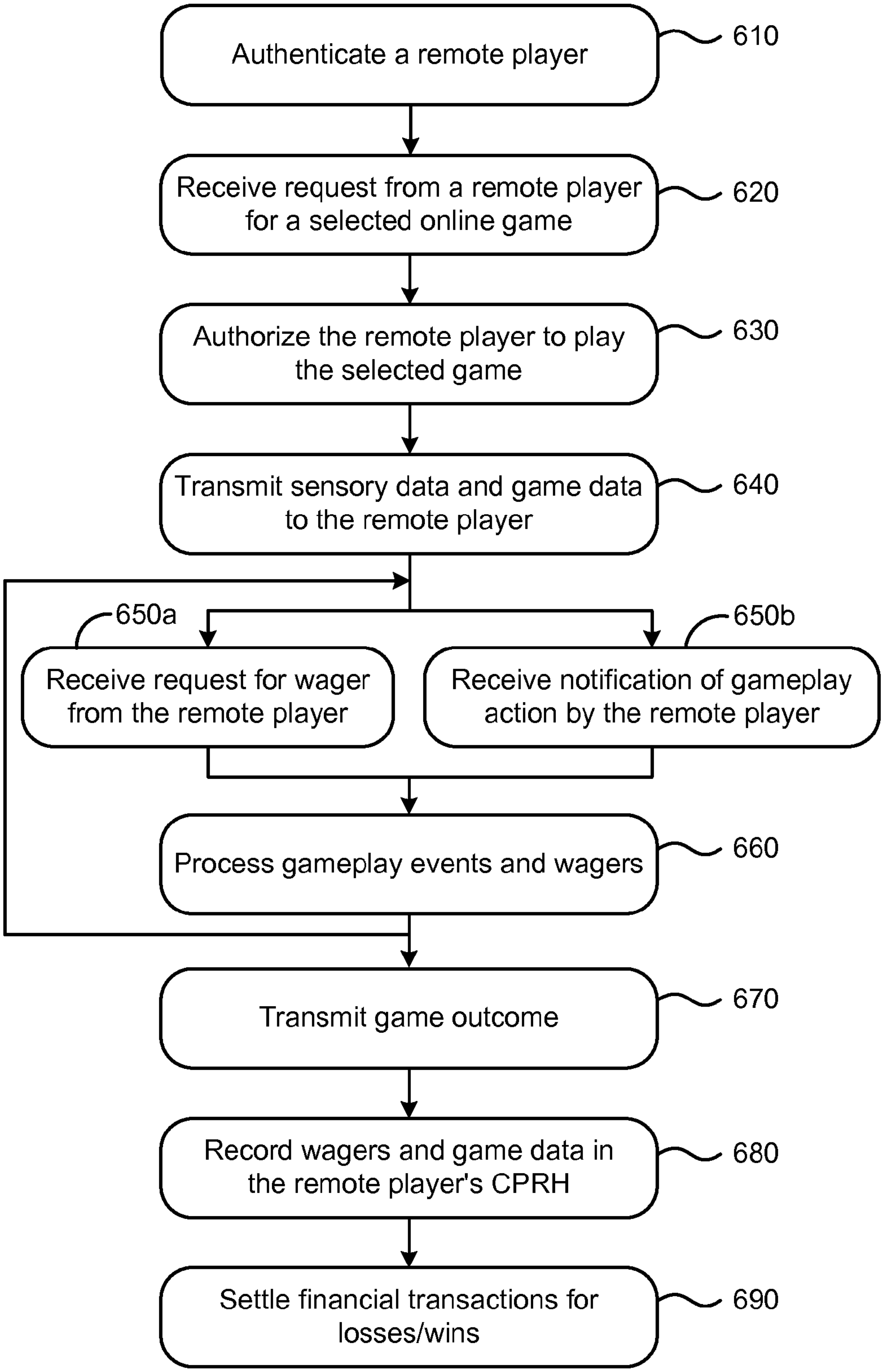
FIG. 6 is a flowchart of a method for interactive online gaming within an environment incorporating sensory data and/or gameplay data from a live, real-world game.
Figure 7A:
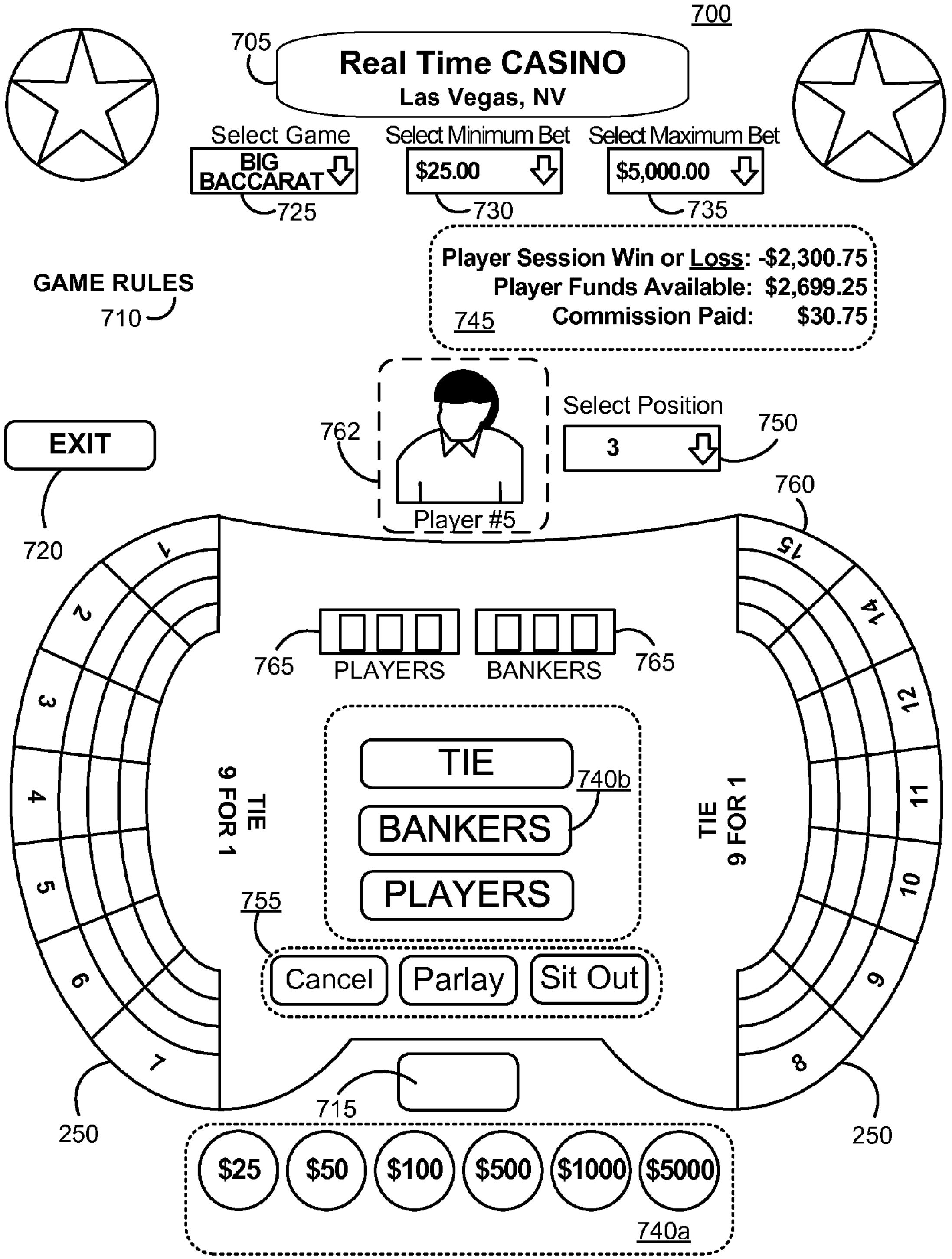
FIG. 7(*a*) is an illustration of a web page including an overhead view of an intelligent Big Baccarat game table with an incorporated Remote Player's User Interface.
Figure 7B:
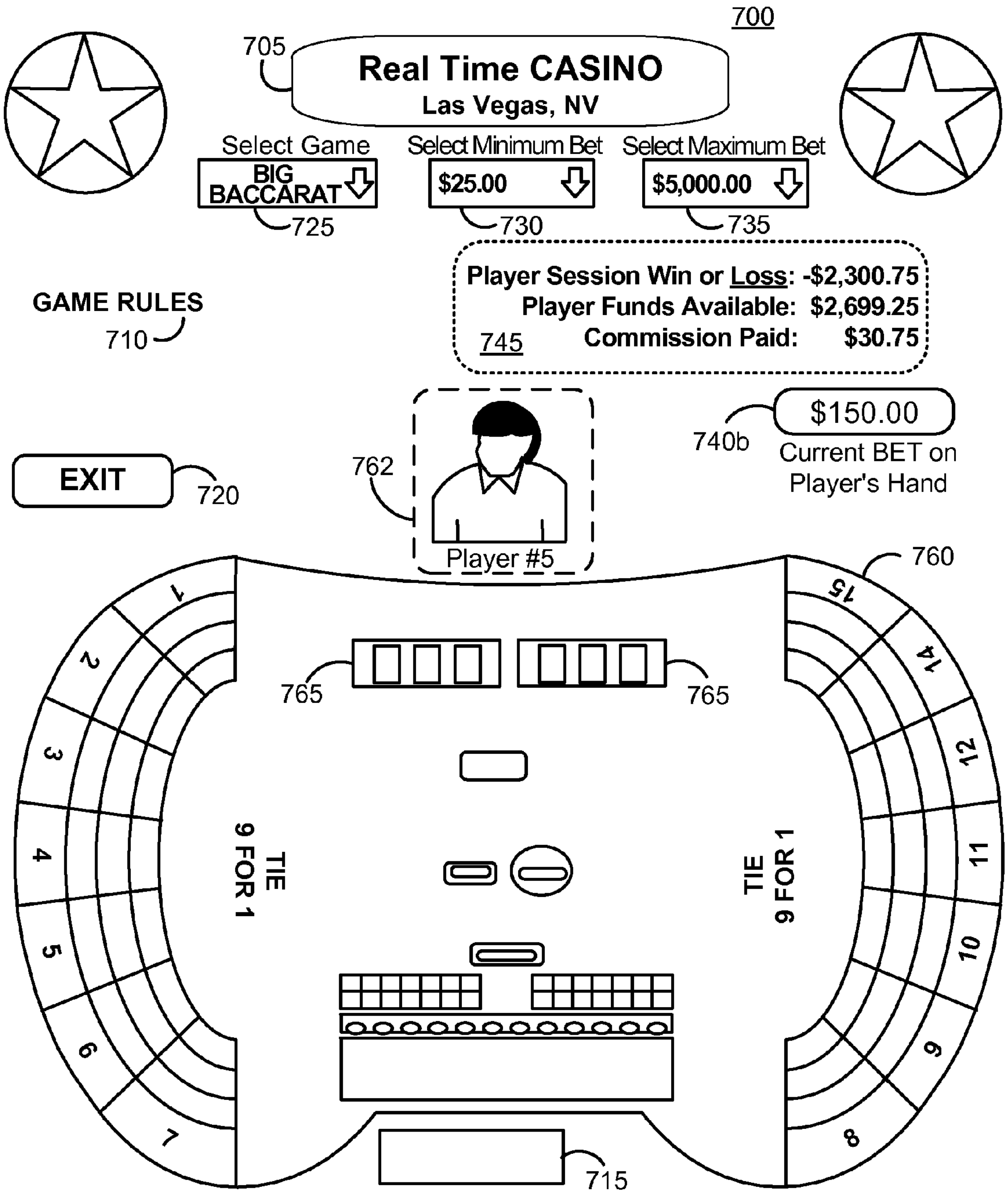
Figure 7C:
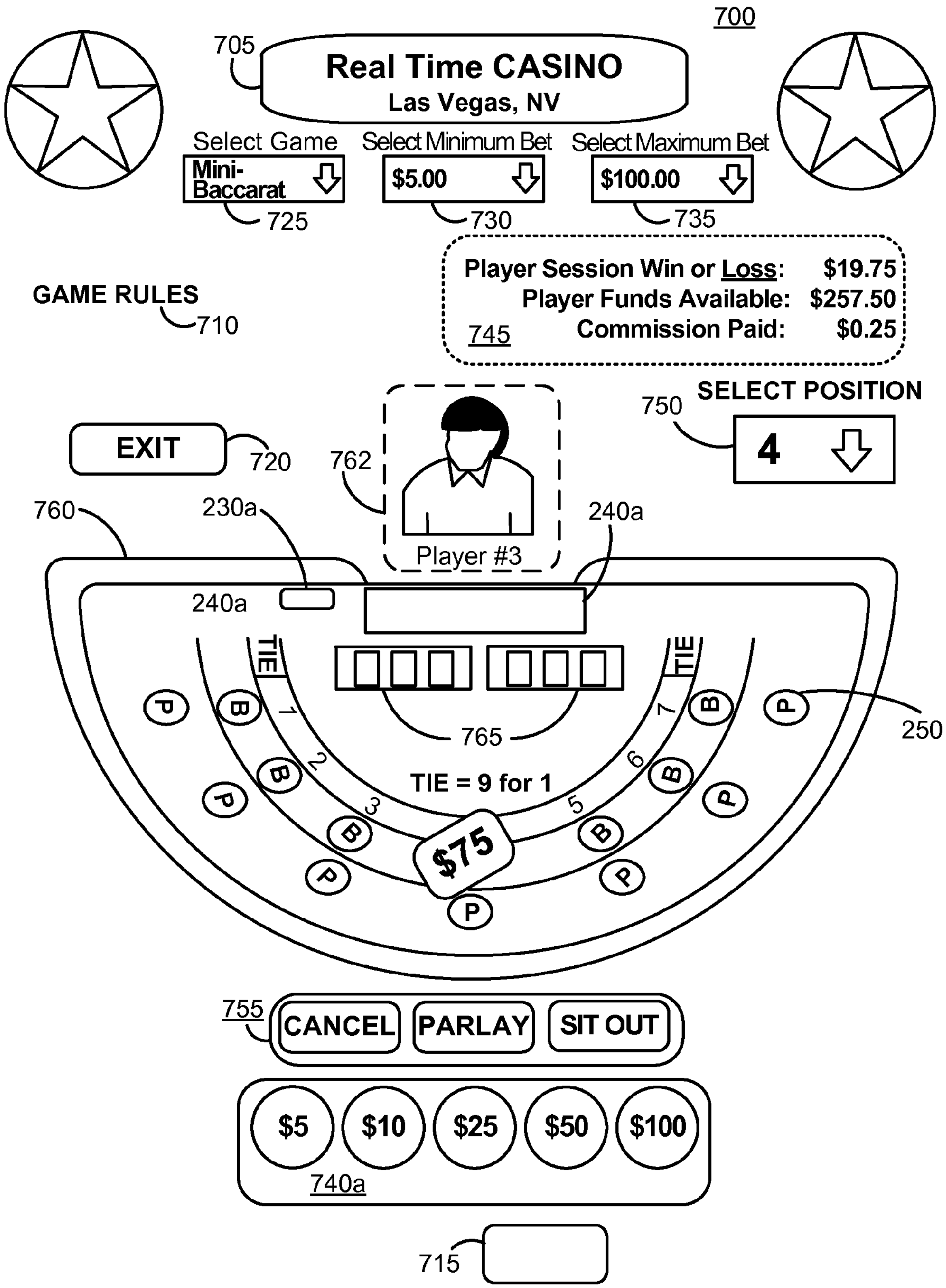
Figure 7D:
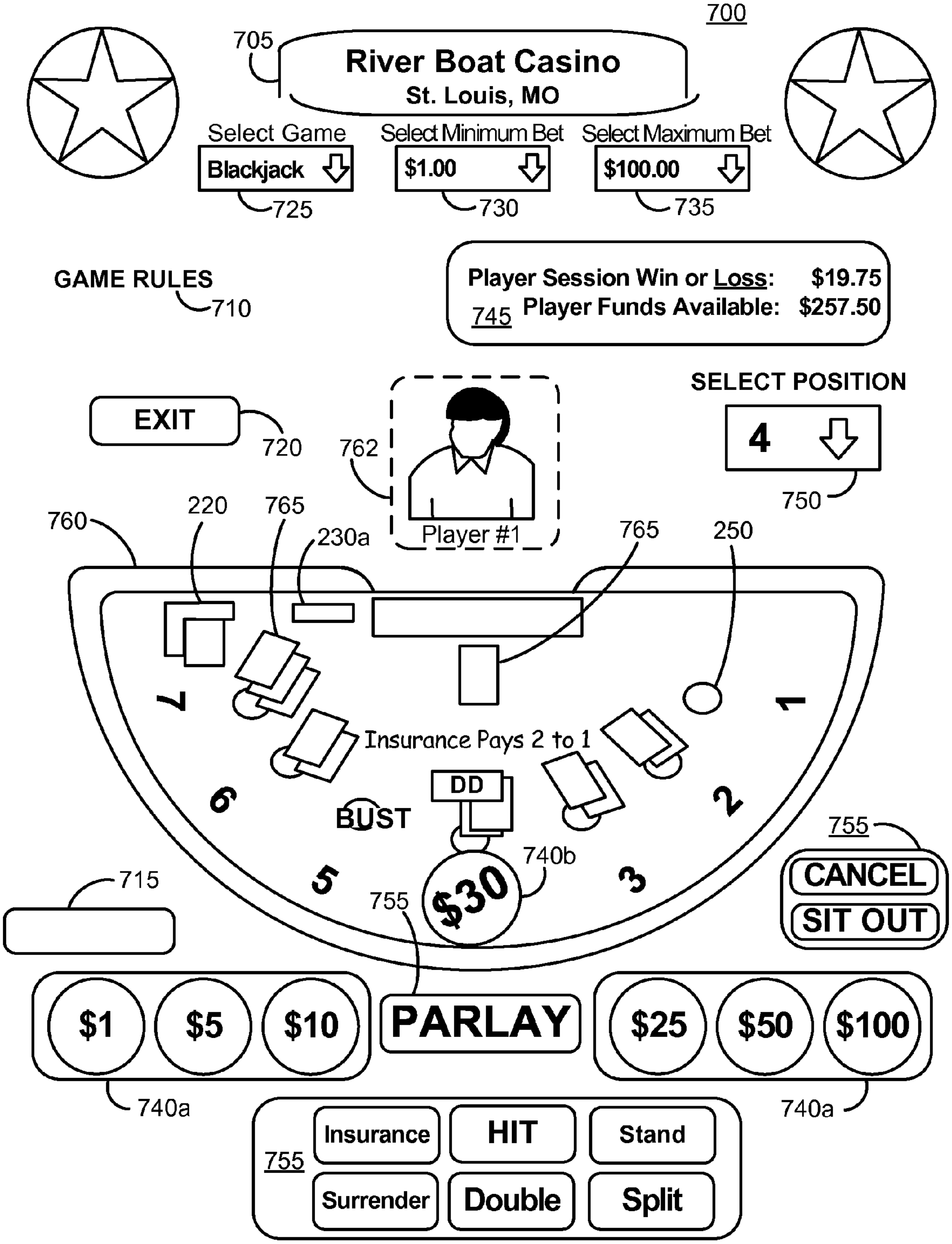
Figure 7E:
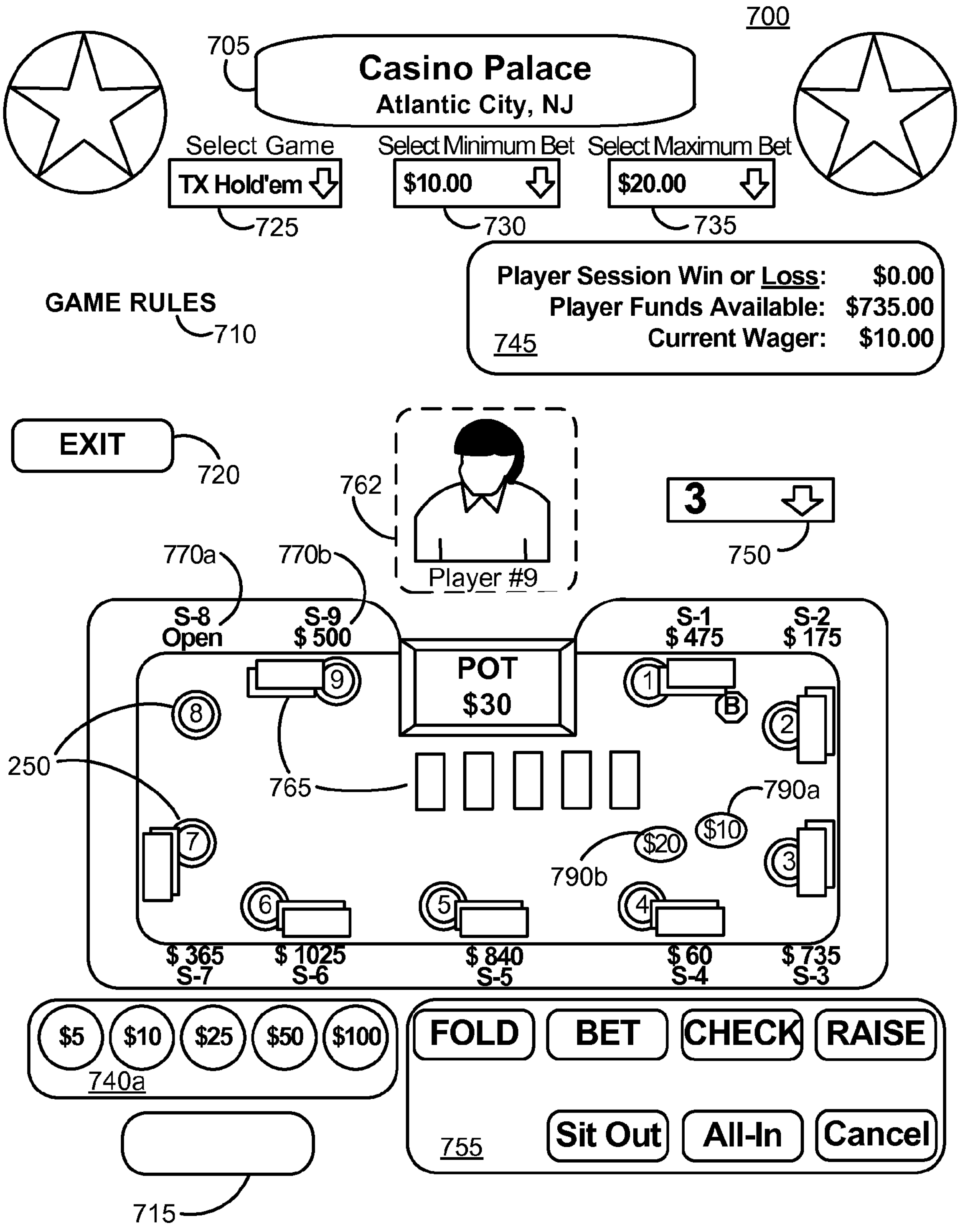

FIG. 6 is a flowchart of a method for providing online gaming functions within a user interface incorporating sensory data and/or gameplay data from a real-world, live game. In one aspect, the online gaming website may receive a request from a remote player to authenticate his or her identity (step 610) in order to gain access to the online games. Authentication may be useful to verify the age of the remote player, determine whether there are any legal restrictions or requirements that apply to the remote player, to maintain a user profile and gameplay history, and to facilitate financial transactions. Authentication may be performed using any conventional method (login/password, biometric identification, etc.). Authentication need not occur at the very beginning of the depicted steps—it may occur at any appropriate point (e.g., immediately prior to authorization, or immediately prior to accepting a wager). In some aspects, authentication may not need to occur at all, such as, for example, when the remote player has accessed the game through a special URL link or interface that is only available to remote players of age from an approved jurisdiction, or no wagering is to be involved. In one aspect, the online gaming website receives a request from a remote player for a selected online game (step 620). As described above, the online gaming website may allow a remote player to search for and/or select an online game. The online gaming website may also present URL links on its homepage to its most popular games or to those games that it wishes to promote. The online gaming website may also allow a remote player to send out "invitations" (e.g., MS Outlook™ calendar appointments, Evite™ invitations, Google™ calendar event invitation, Facebook™ event invitation or application invitation, email, SMS, MMS, etc.), by which the remote player can notify other potential players about the online gaming website, schedule a date and time for multi-player gaming in a single online game instance, and/or restrict multi-player gaming in a single online game instance to invitees.

Before the online gaming website allows the remote player to begin gameplay, it may need to determine whether the remote player is authorized to play the selected game (step 630). In one aspect, such authorization operations may already have been conducted ahead of time (e.g., during authentication). In one aspect, step 630 may simply include determining whether the remote player is authorized to play the game that was selected in step 610. Once the remote player has been authenticated and authorized to play the selected game, the online gaming website may transmit information to the remote user (step 640) for use in the remote player's User Interface ("RPUI"), including but not limited to sensory data and/or gameplay data associated with the selected game. The video and audio captured at the original, live game in the real-world environment is transmitted to the remote user's client computer, where it may be cached and/or pre-processed. Any necessary pre-gameplay processing of the sensory data and/or gameplay data for the selected game (e.g., translation) or input by the remote player (e.g., selection of a particular position/seat at the gaming table) may occur prior to transmission (on the online game server) or after transmission (on the client computer) as is appropriate. Sensory data and/or gameplay data are integrated to present the remote player with an online gaming environment that allows the remote player to participate in the game as if the remote player had been present at the original, live game in the real-world environment. The online gaming website may display images 762 of the original, real-world players of the game.

As the game begins, the remote player may place wagers (step 650*a*), and various gameplay events may occur—some of which are gameplay actions triggered by the remote player (step 650*b*), and some of which are gameplay events that occurred in the original, live, real-world game (e.g., order of cards dealt out, wagers and gameplay actions made by the original, real-world players). Gameplay events (including gameplay actions by the remote player) and wagers placed by the remote player are processed by the online game server, and gameplay events from the original, live game in the real-world environment are transmitted by the online game server to the remote player's client computer (step 660). Processing of gameplay actions by the online game server may include but is not limited to: determining what type of gameplay event has been triggered (e.g., in Blackjack: determining that the remote player has busted, i.e., exceeded 21; determining that the remote player has not yet reached 21, so the remote player should be presented with the option of taking another hit, i.e., drawing another card; or determining that the remote player has a pair, so the remote player should be allowed to split the pair and add an equivalent wager amount); analyzing the remote player's gameplay action in light of the remote player's gameplay history (e.g., in Blackjack, the likelihood of the remote player to take another hit despite the fact that the dealer is showing a six); re-calculating game outcome probabilities in light of the remote player's gameplay action; detecting unusual or suspicious gameplay actions and/or patterns; determining the game outcome (e.g., in Blackjack, that the remote player has busted, and so the remote player's wager can be collected, or, alternatively, that the remote player was dealt a Blackjack, and so the remote player should be paid 1.5 times their placed wager, and the remote player is no longer active in the game round); and determining that the remote player has qualified for a marketing offer or promotion (e.g., once a remote player has played some number of game hands, the remote player may be offered a bonus, discount offer, gaming incentive, or special opportunity). Processing of gameplay actions by the online game server may also include determining that the remote player has taken an action that differs from that taken by the original, real-world player, thereby causing divergence between the online game events and the re-produced real-world environment. Processing of wagers placed by the remote player may include, but is not limited to: determining whether the remote player has sufficient funds to place the wager; determining whether to pause the game and offer the remote player an opportunity to authorize additional funds (e.g., by entering a credit card, or by authorizing an EFT) in order to place the wager; maintaining betting history and betting statistics, wherein such history and statistics may be specific to the player, to the game round, to the particular shoe, to the casino, etc.; deducting an amount equal to the amount of the wager from an account associated with the remote player; determining that the remote player has qualified for a particular marketing offer or promotion; and detecting unusual or suspicious betting activity or patterns.

In one aspect, the online gaming website may automatically pause when some input is required by the remote player (e.g., wager, gameplay action); such a pause may be limited to a set duration of time. In one aspect, the duration of time may be determined by the online gaming website; in one aspect, the duration of time may be controlled by the remote player, yet may also be limited by the online gaming website. In another aspect, the online gaming website may provide a button or URL link on the web page to enable the remote player to pause the online game until the remote player is ready to continue; in one aspect, the online gaming website may place a limit on how long the remote player can pause the game. As long as gameplay continues in the current round, steps 650*a*, 650*b*, and 660 may proceed in a loop until the round is finished, at which point the online game server transmits the outcome of the game (step 670) to the remote player (e.g., who won, whether the remote player lost or tied, updated player rank/status for a tournament, amount won/lost, commissions charged, etc.).

In one aspect, an online gaming website may collect statistics and other data from the remote player's online game to calculate the "Complimentary Value" and "True Worth" of the remote player. In order to make such a calculation, the casino may use relevant game and remote player data collected by the system to build and maintain a Customer Player Rating History ("CPRH") database. Remote player data may include and/or be integrated with information related to PTCs issued by a real-world casino—such data may help a casino or online gaming website to identify its earning potential from different remote players. In one aspect, once the round is complete and the game outcome has been determined, the online game server may send final gameplay data and remote player data captured from the remote player's online game to database 140 and engine 145 for any processing and storage (e.g., maintaining CPRH, calculating statistics) (step 680).

In one aspect, any necessary financial transactions resulting from the game (e.g., payout of winnings to remote player or debit of lost wager from a remote player) may occur after each round, after each online session, on a periodic basis (e.g., daily, weekly, monthly, yearly), or as player losses/wins reach a set threshold (e.g., every $10, $100, or $1000) (step 690). In one aspect, a remote player may simply register a credit card with the online gaming website to enable such transactions. In one aspect, a remote player may set up an open electronic funds transfer ("EFT") authorization for the online gaming website with respect to a bank account owned by the remote player. In one aspect, a remote player may simply deposit funds into an account held by the online gaming website or the real-world casino, or by a financial institution associated with the online gaming website or the real-world casino. In one aspect, a remote player may deposit funds into an escrow account to which the online gaming website has either access or authorization to credit and debit funds.

Remote Player's User Interface

Online game server 150 provides online gaming functions within a Remote Player's User Interface ("RPUI") that incorporates sensory data and/or gameplay data from a real-world, live game. Remote players may access online game server 150 using a client computer; as previously discussed above, any conventional configuration for a client computer is encompassed by this disclosure. In one aspect, the online gaming website is accessible by conventional Internet browsing programs running on a remote player's client computer. In one aspect, the online gaming website is accessible through software programs that may be downloaded and executed by the remote player on their client computer. Using the RPUI, the remote player can view a game in real-time as it proceeds, enter wagers and gameplay actions, and view the outcome of the game. The RPUI may vary according to the type of game, the player's location, the type of client computer used by the remote player, and/or the player's preferences. When online game server 150 receives a request to access gaming functions from a remote player, online game server 150 may access captured gameplay data from database 140; online game server 150 may also access captured sensory data from database 130. Online game server 150 may perform additional processing upon the captured gameplay data (e.g., to customize it for the remote player, to perform compression, or to perform player-specific calculations) prior to transmission over a network back to the remote player's client computer; any such additional processing may utilize engine 145 or may be performed by online game server 150 itself. Online game server 150 may also perform additional processing upon the captured sensory data prior to transmission over a network back to the remote player's client computer (e.g., to customize it for the remote player, to perform compression, to blur out faces or images as necessary, or to mute inappropriate or undesirable sounds or language); any such additional processing may utilize engine 135 or may be performed by online game server 150 itself.

In one aspect, the remote player may be allowed to choose a particular position or "seat," and thereby play in the online game at the position/seat occupied by one of the original, real-world players. In one aspect, the remote player may be able to see and hear, through the RPUI, many of the sensory data and/or gameplay events that the original, real-world player was able to see and hear while sitting in that seat or standing in that position. Although the remote player is playing in the online game at the position/seat occupied by one of the original, real-world players, the remote player may not be limited to the amount wagered by the original real-world player; the online gaming website may accept wagers in a different amount than that wagered by the original real-world player. In one aspect, for certain games (e.g., craps, roulette, Texas Hold 'Em poker), the remote player experiences the same gameplay events (e.g., the particular faces of the dice that land facing up, the fall of the roulette ball into a particular pocket of the wheel, the particular cards dealt to each player, seat/position, game hand, or dealer at the table) and game outcome (e.g., win/loss/tie) as the original real-world player, but the remote player may experience the financial effect of that game outcome differently than did the original real-world player (e.g., when the remote player refrained from placing a wager at a time when the original real-world player did place a wager, and vice versa, or when the remote player bet more or less than did the original real-world player).

In one aspect, with respect to card games, the remote player will be dealt the same cards in each round as were dealt to the original, real-world player at his chosen position/seat (if the original, real-world player was playing more than one game hand, but the remote player is only playing one game hand, the remote player will only be dealt a single game hand), but the remote player will be allowed to make strategic decisions that differ from those made by the original, real-world player in the original, live game. For example, the remote player may choose to fold or stay in the game when the original, real-world player did not, or the remote play may choose to take extra cards when the original, real-world player did not, and vice versa. In one aspect, the remote player may be able to request gameplay recommendations according to one or more conventional gameplay strategies. In one aspect, the remote player may be able to review game rules. In one aspect, the remote player may be able to request and view a "replay" of all or a portion of the game round.

In one aspect, the online gaming website may permit the remote player to see the wagers placed and gameplay actions taken by the original, real-world player at a particular point in the game before requiring the remote player to decide what strategy he or she will apply at that same point in the game. In such "educational" situations, the online gaming website may restrict or eliminate wagers.

FIG. 7(*a*) is an illustration of a web page 700 including an overhead view of an intelligent Big Baccarat game table with an incorporated RPUI. Web page 700 may include game information and functions, as well as casino environment 760. Web page 700 may include basic information and functionality: the name and location 705 of the real-world casino associated with the original, live game; a URL link 710 to access game rules; a button 715 to activate or de-activate integration of gaming functionality into casino environment 760 (in FIG. 7(*a*), gaming functionality has been activated for integration into casino environment 760); and a button 720 to exit the gaming window.

Web page 700 may indicate the type of game currently being played, along with a way for the remote player to select a different game (e.g., drop-down list 725). Web page 700 may also display lists of minimum and maximum wager amounts (e.g., drop-down lists 730 and 735), which may be set by the online gaming website or by the associated real-world casino. Web page 700 may also provide a way for the remote player to enter bet(s) using standard chip denominations and display the current bet placed by the remote player (740*a*, 740*b*)—in one aspect, this interface may be game-specific. In some aspects, web page 700 may provide one or more areas for a remote player to directly enter arbitrary wager amounts. Web page 700 may display wagering and financial status information 745 (e.g., amount wagered/won/lost, commissions paid, amount of player funds that are available, etc.), certain types of which may be presented in different contexts (e.g., per round, per online session, historically, by game type, by casino, etc.). Web page 700 may allow the remote player to select his or her position at the table (e.g., drop-down list 750); in some aspects, the remote player may be able to play more than one position at the table at a time. In some aspects, according to the game type and rules, the position(s) selected by the remote player will be highlighted or otherwise emphasized when viewing casino environment 760. Web page 700 may provide buttons 755 for the remote player to make wagers or perform various gameplay actions. One of the buttons 755 may allow the remote player to cancel his or her most recent gameplay action, where appropriate (e.g., bet, sit out, surrender cards, bet insurance, etc.).

In one aspect, casino environment 760 plays a real-time audiovisual recording of a live game previously recorded in a real-world casino; in another aspect, casino environment 760 streams audio and video of a live game being currently played in a real-world casino. Casino environment 760 may show the live game using an overhead view, a view of the game from the dealer's position, from the one or more positions selected by the remote player to "sit at" and play the game, from one or more of the other real-world players' positions, from the surface of the gaming table, or from any other position. Casino environment 760 may switch between views during gameplay; in one aspect, casino environment 760 does not display views from the position of the remote player's opponent, whether that may be the dealer, banker, or one or more other players. Images 762 of the other players in the game and the dealer/banker, either static photographs or real-time video recorded during play of the current game, may be included in casino environment 760, or there may be a URL link or other website features (e.g., a mouse-over feature provided in relation to each individual playing area 250) that enables the remote player to view the images. Such images 762 of the other players may be of the original, real-world players in the live game at the real-world casino, or, for online game instances in which multiple remote players are participating, images of a real-world player may be replaced by images of the remote player occupying the seat/position of the real-world player. Such images 762 may be disabled for a given real-world player when said real-world player requested (at the live game in the real-world casino) that their image be filtered or blocked (i.e., not shown online). Individual playing area 250 may be highlighted for real-world players for whom images are available and shaded or darkened for real-world players for whom images are not available. Game outcome events may be displayed to the remote player in any one of a number of ways: real-time video/audio/still photograph (e.g., panning and zooming a camera to focus in on the actual cards, dice, a roulette ball, etc.), a digitized image of the game outcome event (e.g., digitized images of the cards in the Player's Hand and the Banker's Hand in Baccarat), highlighting or otherwise emphasizing the critical area of the gaming area (e.g., displaying a highlight outline of the pocket on a roulette wheel into which the ball landed), announcing the game outcome event and/or the impact of the game outcome event on the remote player (e.g., for special interfaces for the blind), or any other method of notifying the remote player of the game outcome event. In the example shown in FIG. 7(*a*), gaming functionality has been activated for integration into casino environment 760. Therefore, for example, casino environment 760 may show a digitized representation of the cards that have been dealt 765 (in Big Baccarat, the cards that have been dealt 765 include the Player's Hand and the Banker's Hand). In one aspect, a mouse-over feature for the cards that have been dealt 765 provides an enlarged view of the cards may be displayed in a static or transient (e.g., "pop-up" window) manner.

Web page 700 may also provide game-specific customization of features and functionality. For example, FIG. 7(*a*) depicts a Big Baccarat game, so, in one aspect, a remote player may click his or her mouse on a standard chip denomination in area 740*a*, then click on or drag the mouse over to one of the betting boxes in area 740*b* marked "Player's Hand," the "Banker's Hand," or a "Tie." Once the remote player has placed his or her bet, the betting box in area 740*b* on which the remote player placed his or her bet may display the amount of the wager. In one aspect of a web page for playing Big Baccarat, one of the buttons 755 may allow the remote player to sit out for one or more rounds; when a remote player is sitting out a round, the "Sit Out" button may be highlighted, and when a remote player is actively playing, that button may be dark. In one aspect of a web page for playing Big Baccarat, one of the buttons 755 may allow the remote player to parlay his or her bet for one or more rounds; when a remote player is parlaying his or her bet, the "Parlay" button may be highlighted, and when a remote player is actively betting, that button may be dark. In the event that a Parlayed bet exceeds the selected game table limit the system will automatically reduce the amount of the parlayed bet to the amount of maximum bet allowed. When a player loses a Parlayed bet the system will automatically place the minimum wager allowed at the game table for the upcoming game round.

FIG. 7(*b*) is an illustration of web page 700 from FIG. 7(*a*) wherein gaming functionality has been de-activated for integration into casino environment 760, so as to provide a better view of casino environment 760. For example, instead of displaying the chip denominations in area 740*a* and all three potential betting boxes in area 740*b*, web page 700 merely displays the remote player's current bet in area 740*b*. In one aspect, gaming functionality may only be de-activated for integration when gameplay is not waiting for the remote player to take his or her turn to make a wager or enter a gameplay action. In FIG. 7(*b*), if the remote player were to click on button 715, the remote player would be taken back to a version of web page 700 that included a full wagering interface (e.g., FIG. 7(*a*)).

FIG. 7(*c*) is an illustration of a web page including an overhead view of an intelligent mini-Baccarat game table with an incorporated RPUI. Since the game of mini-Baccarat shares a number of similarities to Big Baccarat, the layout of the gaming table in casino environment 760 shares certain features, including but not limited to a designated area to display the cards dealt for the Player's Hand 765, a designated area to display the Banker's Hand 765, a cash drop slot 230*a*, chip tray 240*a*, and individual betting areas 250 to place bets on the Player's Hand, the Banker's Hand, or a Tie.

FIG. 7(*d*) is an illustration of a web page including an overhead view of an intelligent Blackjack game table with an incorporated RPUI. For Blackjack-type games, the layout of the gaming table in casino environment 760 may include a digitized representation of the cards that have been dealt 765 (in Blackjack-type games, the cards that have been dealt 765 may include cards dealt for each player's individual hand, which are shown in each individual betting area 250, and those dealt for the dealer, which typically consists, at least initially, of one card face-up and one card face-down). In Blackjack-type games where the other players' individual hands are dealt face-down, the remote player may not be able to view digitized representations of the other players' individual hands. In one aspect, one of the buttons 755 may allow the remote player to insure his or her bet when appropriate (e.g., when the dealer's card is showing an Ace). In one aspect, one of the buttons 755 may allow the remote player to surrender his cards in exchange for giving up a portion of his bet. In one aspect, one of the buttons 755 may allow the remote player to hit (i.e., take a card from the dealer) until the player busts. In one aspect, one of the buttons 755 may allow the remote player to double-down (i.e., double his or her current bet on his hand, receive exactly one card, and relinquish the right to request any additional hits during the round). In one aspect, one of the buttons 755 may allow the remote player to indicate that he or she will stand or stay on his or her hand (i.e., that the remote player does not want to take any (more) cards, and that the dealer can move on to the next player or to the dealer's own hand). In one aspect, one of the buttons 755 may allow the remote player to split a pair of cards (i.e., effectively create two hands from one and adding a second bet for the new hand, typically in an amount equal to the original bet).

FIG. 7(*e*) is an illustration of a web page including an overhead view of an intelligent Texas Hold 'Em poker game table with an incorporated RPUI. In one aspect where multiple remote players are able to participate in the same online game instance, web page 700 may indicate which seats/positions are open (e.g., 770*a*) and which are occupied (e.g., 770*b*). Occupied seats/positions may be indicated by text (e.g., 770*b*) or an image representing the current bankroll or chip stack of the remote player in the seat/position. The current position in the rotation of dealer button 780, Small Blind 790*a*, and Big Blind 790*b* may be indicated by any conventional means, including text, an image, highlighting the position/seat, etc. For poker-type games, the layout of the gaming table in casino environment 760 may include show a digitized representation of the cards that have been dealt 765 (in poker-type games, the cards that have been dealt 765 may include cards dealt face-down for each player's individual hand, which are shown in each individual betting area 250, and five community cards dealt face-up, i.e., the Flop, the Turn, and the River). In poker-type games where some cards are dealt face-down, the remote player may not be able to view digitized representations of any cards dealt face-down, unless they comprise the hand dealt to the remote player. In one aspect, one of the buttons 755 may allow the remote player to fold his or her hand. In one aspect, one of the buttons 755 may allow the remote player to make various wager-related gameplay actions, including "Bet," "Check," "Raise," and "All-In."

As would be apparent to one of skill in the art, when accessing the online gaming website through a conventional Internet browser, casino environment 760, any game information, and most game functionality, or any portion thereof either may be constantly visible on web page 700, or may be visible in a separate "pop-up" window, or may be available by "mouseover" (i.e., when the remote player passes a mouse or other pointing device over a designated image, text, or area on web page 700). In addition, while the RPUI has been described above by way of describing example games and in terms of specific aspects, it is to be understood that the invention is not limited to the games or variants described herein. As would be apparent to one of skill in the art, various modifications and similar arrangements could be easily made to adapt the RPUI to other games not described herein, as well as variants of the games described herein.

A casino may also provide links to the online gaming site from its main website. Many casinos build and maintain a website to advertise and market their property and offerings. These websites typically include pictures, advertisements, information about the size and amenities of each facility, and other static information. The websites may provide one or more links connecting visitors to the websites of associated casinos. The websites may also provide the capability of booking reservations for rooms, restaurants, and entertainment venues.

Software applications, e.g., engine 145, may be integrated into back-end networked servers to process gameplay data. Processing gameplay data may include monitoring and identifying discrete gameplay actions taken, analyzing gameplay trends, determining the basic strategy and card count system skills of each of the remote players, and calculating the 1$^{st}$ Card Advantage, Complementary Value, and "True Worth" of each remote player. U.S. Pat. Nos. 6,039,650 and 6,299,536 (Hill, O. D.). The incorporation of these software applications should make it impossible for any remote player to use any computer program to overcome the "house" odds, or game advantage, for any casino card game without being identified by one or more of the current invention's backend software applications. Statistical data is commercially available on the "house" game advantage for all casino games of chance; computerized game simulators are also available to calculate the "house" game advantage. Such data analysis may also provide additional means for online gaming websites to identify any remote players who may cheat, and unique methods to facilitate compliance with any laws or regulations, as required by authorized government regulators of licensed online gaming casino operators (e.g., verification of age and geographic (gaming jurisdiction) location of each remote player. Software applications may also be integrated into the system to assure all relevant parties, (e.g. the remote player, the host casino, the gaming regulators, and local, state, regional, national or international governments or agencies due any fees, taxes or fines) of collection of any funds due.

Remote Player's Decision Display

Figure 8:
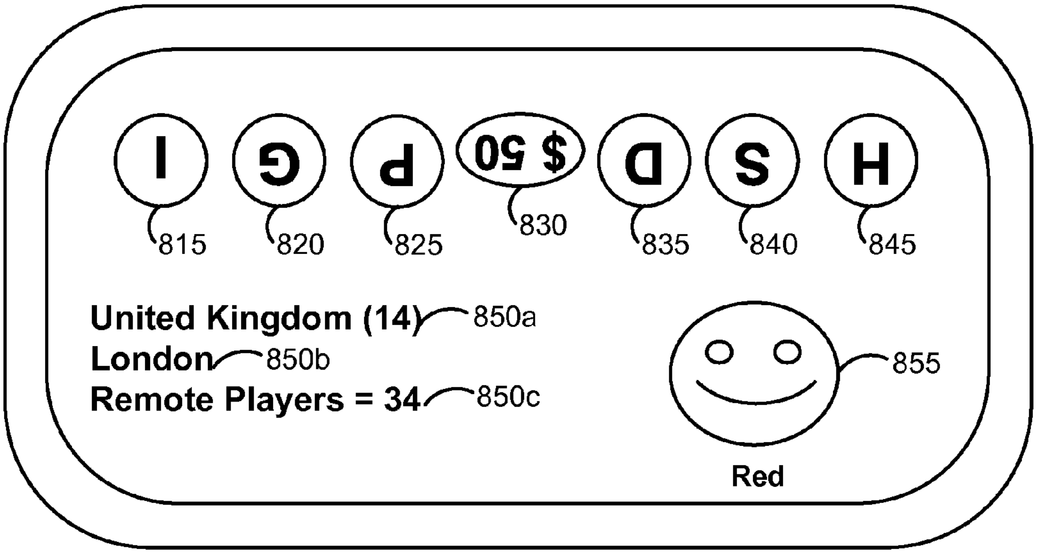
FIG. 8 is an illustration of a portion of a web page displaying a Remote Player's Decision Display.

FIG. 8 illustrates an example Remote Player's Decision Display ("RPDD"). The RPDD displays information about one or more remote players, which may include their wagers, gameplay decisions, and/or personal information. In one embodiment, the RPDD may be incorporated into gaming table 760; in another embodiment, the RPDD may be a separate device; in yet another embodiment, the RPDD comprises an electronic display that may be visible to the dealer and/or any live, real-world players at the gaming table or area, and/or the remote players. In one embodiment, when a first remote player logs into any game seat or position at the gaming table or area, an RPDD is coupled to and interacts with the system software and user interface previously uploaded to the remote player's PC. The amount of the remote player's wager may be displayed, and any strategy decisions taken by the remote player, using the interface installed on his/her computer, may be transferred to the appropriate seat's RPDD to prompt the game dealer as to what strategy decisions the remote player wishes to take on the game hand.

When the game seat selected by a first remote player is not occupied by a real-world player, the play of the game may be as if the first remote player was physically present at the game table. When the same game position is selected by one or more additional remote players, the play of the game may be as if the first remote player was physically present at the game table. Therefore, in the event that the strategy decisions of the one or more additional remote players differ from the strategy decisions of the first remote player, the methods disclosed herein for resolving divergence situations may be applied.

When a first remote player logs into a game table seat, the RPDD may display the remote player's gaming jurisdiction 850*a* and city 850*b*, and the remote player's avatar or photo 855 may be displayed on the appropriate game table seat's "RPDD." In addition, the total number of remote players 850*b* simultaneously playing that particular game table seat may also be displayed on the RPDD.

In the event more than one remote player is playing at the beginning of the next game round, profile information (e.g., Gaming Jurisdiction, City, and Avatar or Photo) of the first remote player may change to that of a second remote player who has selected the identical game seat or position, and then a third remote player, etc. When profile information for the last player has been displayed, the first remote player's information may be displayed again and the display may continue to alternated between the remote players. Further, such information may also be displayed in each of the remote player's user interfaces.

In any live game, the game players come and go, so at any hour of the day, a gaming table or area may be staffed with a dealer, yet lack players. Casino management does not like to see a dealer standing at an empty table or area (because this means that they are paying for overhead cost, for example, the dealer's wages, even when there is no gaming revenue due to the lack of players). However, even if there are no live, real-world players playing at the table, there may be one or more remote players who are interested in a game. In this case, a dealer may continue to deal cards to at least one active seat or position at the game table.

In the event that neither a live, real-world player nor a remote player is playing in at least one active game seat or position, the game dealer may act on the game hand in one of at least two different ways. In one embodiment, the dealer may act on the game hand as if a "Shill" (game starter) is present at the game table and playing the hand (the gameplay rules for Shill play may be programmed into the system). The minimum bet is made for the Shill game hand, which does not surrender that minimum bet, take insurance on the bet, hit a breaking hand, or double-down or split the game hand. Once the original two-card game hand has been dealt to the Shill seat or position, if the Shill gameplay rules require that an action be taken upon the Shill game hand, the system software may illuminate "Hit" indicator 845 to prompt the game dealer to hit the game hand. If no action is required by the game dealer, Wager indicator 830 is illuminated. In another embodiment, a basic strategy may be programmed into the system. Once the original two-card game hand has been dealt to the one active game seat or position, the system software may illuminate the appropriate indicator to "Hit" (845), "Stand" (840), "Double-Down" (835), "Split" (825), "Surrender" (820), or "Insure" the game hand (815) to prompt the game dealer of the appropriate action to be taken on the game hand.

In one embodiment, when a game table seat is active, all of the indicators in FIG. 8(*b*) may be illuminated, and if it is not active, all of the indicators may be dark. (In one embodiment, each RPDD may comprise one or more multicolored LEDs to illuminate the various indicators.) When active, the RPDD may show the amount of the Shill wager. In one embodiment, once the initial game cards have been dealt to the seat or position, the appropriate decision display is illuminated. In one embodiment, when the final action on a game hand has been taken, Wager indicator 830 is illuminated, prompting the game dealer to advance and act on his game hand.

In one embodiment, when a first remote player logs into any game seat or position at the gaming table or area, the Shill mode for the RPDD is disengaged, and the RPDD is coupled to and interacts with the system software and user interface previously uploaded to the remote player's PC.

Real-World Player's Decision Keyboard

Figure 9:
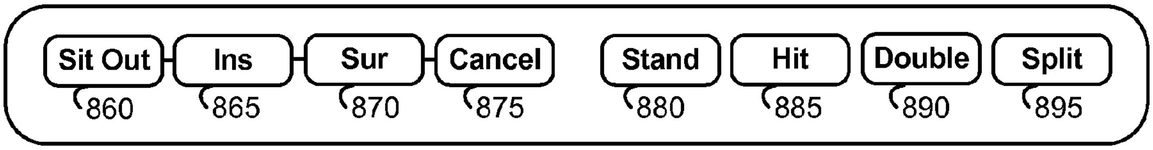
FIG. 9 is a schematic of a Real-World Player's Decision Keyboard.

FIG. 9 illustrates an example Real-World Player's Decision Keyboard ("RWPDK"), which may be configured into the RPDD. Both may be embedded in the game table top 760, and both may be coupled to the system software of the present invention. The RPDD is coupled to the remote player's PC and interacts with the RPUI by means of the Internet.

It is not necessary that the real-world player use the RWPDK, or a similar device, to play the game of Blackjack or any other card game. However, it is preferred so that the game dealer may be able to use the RPDD as a prompt for both real-world players and remote players without being required to identify the difference in the type of players. Further, implementing the use of the RWPDK on live games broadcast of the Internet can serve as an initial step in preparing the real-world player for the installation of RWPDK on most casino card games. Such acceptance by casino customers would prove to be extremely valuable to the host casino as they would provide the very best means for providing game security and gathering marketing information.

The RWPDK consists of eight keys: "Sit Out" (860), "Insure" (865), "Surrender" (870), "Stand" (880), "Hit" (885), "Double-Down" (890), "Split" (895), and "Cancel" (875).

When "Sit Out" key 860 is activated, Wager indicator 830 illuminates to signal the game dealer that the real-world player will not be placing a wager for the upcoming game round. However, in the event that one or more remote players are identified as playing at that seat or position, the game dealer will continue to deal cards to that seat. None of the remote players will be able to activate any of the RPDD displays. When the real-world player again presses the "Sit Out" key 860, Wager indicator 830 is illuminated and normal play of the game hand by the real-world player will resume. When a real-world player presses Cancel key 875, the last action entered into the system by the real-world player will be cancelled unless either a player to the right of that real-world player or the game dealer has acted on his or her game hand.

Age Verification Using Player Tracking Cards

One widely-used method of tracking players, who may move from table to table while at a casino, is the Player Tracking Card ("PTC"). This card may be issued to a player by a given casino or chain of casinos upon verification of their age via a government-issued ID—the card identifies the player and may store some basic information about the player. PTC cards are typically only issued to people who are legally old enough to gamble in the issuing casino. One of the functions of a PTC is to aid in the creation of a Customer Player Rating History ("History"), which may be stored on a networked server; it is possible to create a History for a player without a PTC, but the PTC greatly facilitates this process. The CPRH helps the casino to improve its methods of identifying its earning potential with respect to the tracked player (e.g., a player's "Complimentary Value"). In some cases, the CPRH may indicate is a particular player is blacklisted from the casino.

The CPRH may also be used for the casino's marketing purposes, and so at the time of ID verification, a casino will record the player's profile information: name, date of birth, address, and/or gender. Most Casinos issuing a PTC will share personal information from the PTC applicants profile with other casinos operating under the same parent corporation, thus enabling those casinos, as a group, to jointly build a customer database comprised of tens-of-millions of casino customers who the host casinos have verified as being legally of age to gamble In one aspect, a PTC issued to a remote player at an earlier time when they visited a real-world casino may be used by an online gaming website to verify a player's age. The online gaming website may be either owned by or associated with the real-world casino that issued the PTC; in this case, the online gaming website may require that the remote player enter information from their PTC (e.g., serial number) with or without other identifying information—this may be done during an initial registration process (after which the website may permit the remote player to create a user login and password, issue a cookie, or create some method of identifying the remote player going forward), or the PTC information may be required each time the player visits the online gaming website and requests a game. When the remote player enters their PTC information, the online gaming website may access PTC database 160 to authenticate the PTC and the player and to verify the player's age. A single online gaming website may be able to access PTC databases for more than one casino, and thereby be able to use multiple types of PTCs to verify the age and identity of a would-be remote player. In one aspect, a PTC may also be used to identify and refuse access to a blacklisted player. In one aspect, a PTC may also be used to issue appropriate tax statements, invoices, or collections notices.

Location Verification Using Conventional Methods

In one aspect, when a remote player is using a client computer that can provide location information via a GPS device or cell tower triangulation, the location information may be utilized to verify the location of the remote player and ensure that both the online gaming website and the remote player are in compliance with the laws and regulations of the jurisdiction in which the remote player is located. In one aspect, the location of the player may include a longitude and latitude. In one aspect, the location of the player may include a zip code. In one aspect, the location of the player may include a city and state and/or country. In one aspect, the IP address of the client computer of the remote player may also be used as a proxy for the remote player's actual location. In one aspect, remote players may be able to verify their location by logging in from a real-world facility in a known location, such as a real-world Internet café, school network, office network, or municipal network, either by using client computers provided by the facility, or by using their own client computer (e.g., laptop, netbook, tablet computer, cellphone, or other mobile device) to connect to the online gaming website through a network set up at the facility.

Games Involving Individualized Player Decisions Beyond Wagering

In one aspect, multiple remote players can participate synchronously in a single online game instance, wherein all of the remote players in the game instance are using the same particular shoe, playing at one of the seats at a single gaming table, and potentially affecting the other remote players participating in the single online game instance by his or her gameplay actions; in such a synchronous online game, there may be a maximum number of remote players that are able to participate in a single online game instance (e.g., the number of available seats/positions at the gaming table). In some aspects, a single online game instance may involve multiple gaming areas/tables (e.g., as for a poker tournament); in such a synchronous online game, the maximum number of remote players that are able to participate in a single online game instance may be limited by the total number of available seats/positions in the gaming area or at the gaming tables included in the single online game instance. In some aspects, when multiple remote players are synchronously participating in a single online game instance, the multiple remote players may be aware of each other (e.g., they may be able to see photos or videos of each other, or to be able to chat online in the RPUI). In some aspects, the multiple remote players may be playing together in the same game instance in real-time; in some aspects, delayed play may be possible. In other aspects, multiple remote players may be able to asynchronously play the same pre-recorded real-world game; each remote player, however, plays in his or her own online game instance, so his or her gameplay actions do not affect any other remote player playing the same pre-recorded real-world game.

Games may be divided up into two categories—games in which player strategy does not affect how the cards are dealt (e.g., Baccarat, Texas Hold 'Em poker), and games in which player strategy does affect how many and/or which particular cards are dealt and to whom they are dealt (e.g., Blackjack, Draw Poker). Games that fall into the first category may be handled similarly, whether there is a single remote player or multiple remote players in a single online game instance. Because player strategy cannot affect how cards are dealt from a particular shoe, the online game proceeds exactly as did the original real-world game (to the extent that the same cards will be dealt to the same players, seats/positions, game hands, or dealer, in the same order, and at the same time). Games that fall into the first category may be provided in multi-player format online in either synchronous or asynchronous form—there is no complication arising from one remote player affecting another through his or her gameplay actions.

Games that fall into the second category present unique challenges for creating a gaming experience that seamlessly integrates with the real-world environment as reproduced for the remote player on his or her client computer, because strategic gameplay actions taken by the remote player may generate game events that trigger a divergence situation between the online game events and the recorded or live real-world environment. For example, in a game of Blackjack, if the live, real-world player decided not to hit because he had 13 and the dealer's face-up card was a 4, but in the online game, the remote player decides to hit, a divergence arises in the state of that particular shoe because the remote player will take a card that was not taken in the original, real-world game. Strategies available to a player vary from game to game. In some card games, players are able to make strategic decisions as to whether or not to take an additional card (e.g., Five-Card Draw Poker, Blackjack) and how extra cards will be used (e.g., double-down or split in Blackjack). In some card games, players are able to make strategic decisions as to how the cards dealt to them will be utilized (e.g., Seven-Card Stud Poker, Pai Gow Poker), which card(s) will be revealed (e.g., roll-your-own poker games), or the order in which cards will be revealed to other players (e.g., rollout poker games). In some card games, players are only able to make the decision as to whether to fold (i.e., drop out of the current game) or not, but they are able to fold at a point in the game when their action of folding affects the cards that are dealt out and to whom they are dealt, because there are fewer players or seats/positions to whom cards must be dealt (e.g., Five-Card Stud Poker). Because the RPUI allows the remote player to make strategic decisions that differ from that made by the original, real-world player whose position/seat he or she is occupying, there may be divergence situations involving extra cards (i.e., where more cards are dealt out in the online game than in the original real-world game, for example, when a remote player in an online game takes more "hits" on his Blackjack hand than did the original real-world player in the same seat), or missing cards (i.e., where fewer cards are dealt out in the online game than in the original real-world game, for example, when a remote player folds more quickly than did his counterpart in the original real-world game).

Resolving such divergences may be handled by the online game server; the online game server may compare the remote player's gameplay actions to the gameplay actions taken by the original, real-world player and take appropriate remediation measures when a divergence is detected. In one aspect, such operations may be executed partially or completely on the remote player's client computer.

In one aspect, for games that fall into the second category, when the online game server detects a divergence situation, the divergence situation may be resolved by reconstituting the particular shoe after the remote player has completed his or her turn to take strategic gameplay actions. With respect to extra cards, there may be several different ways of mitigating the divergence situation and reconstituting the particular shoe. In one aspect, reconstituting the particular shoe involves drawing any extra cards from the set of unused cards (i.e., those cards at the "bottom" of the particular shoe that were not used in the original, real-world game)—any extra cards may be dealt out starting with the first unused card, or they may be dealt from the bottom of the particular shoe (i.e., starting with the last unused card and proceeding backwards), or they may be selected at random from the set of unused cards (e.g., by using a RNG). This divergence resolution methodology is ideal because the particular shoe can be reconstituted in a way that is transparent to the remote player.

In another aspect, reconstituting the particular shoe may be achieved with other methods that may be transparent to a remote player that is not counting cards or otherwise keeping track of the cards as they are dealt: (1) switching shoes to a second particular shoe, which may entail that a new set of sensory data and gameplay data is transmitted to the remote player—in this aspect, the online gaming website may check to see if the remote player has accessed games using the second particular shoe yet; or (2) simply advancing the player's game to skip the next round.

In another aspect, reconstituting the particular shoe involves duplication of extra cards that are drawn in the online game—in this way, one may be able to resolve any divergence between the cards that are dealt out and the sensory data presented in the casino environment area of the online game web page, but this solution may be noticeable to the remote player. This may lead to the adverse result (from the viewpoint of the online gaming website) that the remote player may use this information in utilizing a card-counting strategy or may see one or more cards that will be dealt from that particular shoe for the next round, and be able to anticipate to whom the card will be dealt and place a wager to his or her advantage. This situation can be mitigated through several wager limitation strategies: (1) by limiting the player in such a situation to a maximum wager for the next round that is no greater than his or her current wager; or (2) by restricting the player in the next round from placing wagers on any other player's hand besides his or her own hand.

With respect to missing cards, reconstitution may be achieved by simply burning those missing cards that are not used in the online game, or by adding those missing cards that are not used in the online game to the set of unused cards (which can then be used when extra cards are needed).

A few example scenarios illustrating some of the above-described methods of detection and resolution of divergence within an online Blackjack game are described as follows, wherein a typical Blackjack table has seven seats, and a remote player is playing in the position of seat number three. The remote player accesses the online Blackjack game through the RPUI and is dealt the same initial two cards that were dealt to the original, real-world player in seat number three. The two cards dealt to seat number three are a 7 of clubs and a 9 of hearts (total: 16). The dealer's hand is showing a 6 of spades. Because basic, conventional Blackjack strategy dictates that one does not hit a 16 when the dealer is showing a 6, the original, real-world player stood on his game hand as dealt, the dealer showed the 10 of hearts underneath the 6, drew a 10 of diamonds and busted, and so the original, real-world player won. The remote player, however, is eager to test his luck, so he decides to request another card. In a first scenario, where divergence involving an extra card is resolved by drawing the extra card from the set of unused cards at the bottom of the particular shoe, the remote player draws a 4 of spades for a total of 20; the dealer still draws the 10 of diamonds and busts. In a second scenario, the remote player draws the 10 of diamonds and then busts with a hand totaling 25. In this scenario, the divergence is addressed by duplication, so although the remote player drew the 10 of diamonds, that card is duplicated, and the dealer still draws the same card and busts. In a third scenario, the online game server detects the divergence and causes the cards used in the next round to be burned, thereby skipping that next round.

Streaming Live Games in Real-Time

In one aspect, the online gaming website may stream a live game at a real-world casino in real-time and permit any number of remote players to participate in the game, wherein the online gaming website restricts the remote player to experiencing the casino environment and gameplay events from the perspective of the one or more live, real-world players selected by the remote player. In one aspect, when streaming a live game at a real-world casino in real-time, the online gaming website may permit the remote player to participate in the game as described above. Buttons 755 may include a button to permit the remote player to accept game strategy decisions (for gameplay actions) made by the live, real-world person actually engaged in the live, real-world game. In another aspect, when streaming a live game at a real-world casino in real-time, the online gaming website may limit the remote player to simply wagering alongside the one of the live, real-world players. In this example, the remote player's interaction with the game may be limited to declining to wager or selecting an amount to be wagered each game round. In one aspect, when streaming a live game captured at a real-world casino in real-time, the online gaming website may allow the remote player to enter his or her own strategy decisions independently of any strategy decisions entered by the real-world player on a game hand. In this example, the game outcome for the remote player may differ from the game outcome for the real-world player with respect to a game hand.

Security Measures

Casinos employ a number of security measures designed to facilitate gameplay, ensure revenue, and defeat cheating. Measures employed in the gaming room may include audiovisual surveillance, monitoring by dealers and pit managers, playing card-dispensing shoes with internal and external card scanning devices, and intelligent card game tables. Other measures may include analytical software that identifies trends in gameplay, analyzes player strategies (e.g., "Basic Strategy" or "Card Count System"), determines game outcome probabilities (e.g., "First-Card Advantage" in baccarat games), and calculates the casino's profit/loss projections with respect to a given player (e.g., "Complimentary Equivalency" and "True Worth"). The above-described methods and systems are well-known in the prior art.

While the invention has been described by way of example and in terms of specific aspects, it is to be understood that the invention is not limited to the disclosed aspects. To the contrary, it is intended to cover various modifications and similar arrangements as would be apparent to those skilled in the art. For example, other types of games played online, whether or not such games have been offered at real-world casinos, may also benefit from the methods, systems, and apparatuses described here, including but not limited to games involving groups of people (e.g., bridge, mahjong, bingo, domino games, dice games, board games such as Scrabble™, Risk™, Monopoly™, Dungeons & Dragons™) and games played before an audience (e.g., TV gameshows and/or public competitions in front of a live audience, such as the World Series of Poker, the World Boardgaming Championships, World Series of Mahjong). In addition, for example, the concept of capturing sensory data is not limited to audiovisual stimuli—current or future technology may enable sensory capture and reproduction of other aspects of the real-world environment (e.g. olfactory stimuli, gustatory stimuli, tactile sensations of vibration, pressure, pain, and heat/cold). Therefore, the scope of the appended claims should be accorded the broadest interpretation so as to encompass all such modifications and similar arrangements.

What is claimed is:

1. A system for providing online gaming with real-world data, comprising:

one or more capture devices for capturing gameplay data from a live card game being played in a real-world environment, wherein the live card game is a game played with at least one live player physically present in the real-world environment, and wherein the captured gameplay data includes recorded gameplay actions taken by the at least one live player;

a first non-transitory computer-readable medium for storing captured gameplay data for delayed playback;

a memory comprising instructions for an engine for processing the captured gameplay data; and an online game server comprising a processor, a memory, and storage for computer instructions executable by the online game server, wherein the computer instructions comprise:

a) program code for presenting a card game in a user interface to a remote player on their client computer, wherein the card game is based on the captured gameplay data, and wherein the remote player receives cards as they were dealt to the position occupied by the live player;

b) program code for receiving information transmitted using the user interface about a gameplay action taken by the remote player;

c) program code for processing the received information about the gameplay action;

d) program code for determining that the gameplay action triggered a divergence situation, wherein the divergence situation is a situation wherein the gameplay action of the remote player differs from the gameplay action taken by the live player; and e) program code for resolving the divergence situation, by reconstituting a card deck such that outcomes for the live player are not altered by the gameplay action of the remote player.

2. The system of claim 1, further comprising:

a database for storing the captured gameplay data; and logic for retrieving, using the online game server, the captured gameplay data from the database.

3. The system of claim 1, further comprising:

one or more capture devices for capturing sensory data from a live card game in a real-world environment;

a second non-transitory computer-readable medium for storing captured sensory data that is available for delayed playback;

a memory comprising instructions for an engine for processing the captured sensory data; and a portion of the user interface that presents the captured sensory data.

4. The system of claim 3, further comprising:

a database for storing the captured sensory data; and logic for retrieving, using the online game server, the captured sensory data from the database.

5. The system of claim 1, wherein the online game server is operable to execute further instructions comprising:

f) program code for receiving information transmitted using the user interface about a wager; and g) program code for processing the wager.

6. The system of claim 1, wherein the online game server is operable to execute further instructions comprising:

f) program code for receiving information transmitted, using the user interface, about a player tracking card associated with the remote player; and g) program code for verifying the remote player's age, using the information transmitted about the player tracking card.

7. An online game server for providing online gaming with real-world data, comprising:

a first non-transitory computer-readable medium for storing captured gameplay data for delayed playback;

a memory programmed with instructions, comprising:

a) program code for retrieving captured gameplay data captured from a live card game being played in a real-world environment, wherein the live card game is a game played with at least one live player physically present in the real-world environment, and wherein the captured gameplay data includes recorded gameplay actions taken by the at least one live player;

b) program code for presenting a card game in a user interface to a remote player on their client computer, wherein the card game is based on the captured gameplay data, wherein the user interface includes the captured gameplay data, and wherein the remote player receives cards as they were dealt to the position occupied by the live player;

c) program code for receiving information transmitted using the user interface about a gameplay action taken by the remote player;

d) program code for processing the received information about the gameplay action;

e) program code for determining that the gameplay action triggered a divergence situation, wherein the divergence situation is a situation wherein the gameplay action of the remote player differs from the gameplay action taken by the live player; and f) program code for resolving the divergence situation, by reconstituting a card deck such that outcomes for the live player are not altered by the gameplay action of the remote player; and a processor for executing the instructions in the memory.

8. The online game server of claim 7, wherein the memory is programmed with further instructions, comprising program code for retrieving the captured gameplay data from a database.

9. The online game server of claim 7, wherein the memory is programmed with further instructions comprising:

g) program code for retrieving captured sensory data captured from a live card game in a real-world environment; and h) program code for transmitting information to present the user interface, wherein the user interface includes the captured sensory data.

10. The online game server of claim 9, wherein the memory is programmed with further instructions comprising program code for retrieving the captured sensory data from a database.

11. The online game server of claim 7, wherein the memory is programmed with further instructions comprising:

g) program code for receiving information transmitted using the user interface about a wager; and h) program code for processing the wager.

12. The online game server of claim 7, wherein the memory is programmed with further instructions comprising:

g) program code for receiving information about a player tracking card associated with the remote player; and h) program code for verifying the remote player's age, using the information about the player tracking card.

13. The online game server of claim 7, wherein the memory is programmed with further instructions comprising program code for determining a location for the remote player's client computer.

14. A computer-implemented method for providing online gaming with real-world data, comprising:

retrieving gameplay data captured from a live card game being played in a real-world environment, wherein the live card game is a game played with at least one live player physically present in the real-world environment, and wherein the captured gameplay data includes recorded gameplay actions taken by the at least one live player;

transmitting information to present a user interface to a remote player on their client computer, wherein the user interface includes the captured gameplay data, and wherein the remote player receives cards as they were dealt to the position occupied by the live player;

receiving information transmitted, using the user interface, about a gameplay action taken by the remote player;

using a processor and a memory to process the gameplay action;

using the processor to determine that the gameplay action triggered a divergence situation, wherein the divergence situation is a situation wherein the gameplay action of the remote player differs from the gameplay action taken by the live player; and resolving the divergence situation, by reconstituting a card deck such that outcomes for the live player are not altered by the gameplay action of the remote player.

15. The method of claim 14, further comprising:

capturing the gameplay data using capture devices located in a gaming area in a live, real-world environment, wherein the live card game is located in the gaming area in the live, real-world environment.

16. The method of claim 14, further comprising:

retrieving sensory data captured from the live card game in the real-world environment, wherein the captured sensory data is available for delayed playback; and transmitting information to present the user interface, wherein the user interface includes the captured sensory data.

17. The method of claim 14, further comprising:

capturing the sensory data using capture devices located in a gaming area in a live, real-world environment, wherein the live card game is located in the gaming area in the live, real-world environment.

18. The method of claim 14, further comprising:

receiving information transmitted using the user interface about a wager; and processing the wager.

19. The method of claim 14, further comprising:

receiving information transmitted, using the user interface, about a player tracking card associated with the remote player; and verifying the remote player's age, using the information about the player tracking card.

20. The method of claim 14, further comprising:

determining a location for the remote player's client computer.

* * * * *